(12) United States Patent
Holmberg et al.

(10) Patent No.: US 11,615,023 B2
(45) Date of Patent: Mar. 28, 2023

(54) BIT REGISTER IN SHARED MEMORY INDICATING THE PROCESSOR AND THE SOFTWARE HANDLERS

(71) Applicant: Telefonaktiebolaget LM Ericsson (publ), Stockholm (SE)

(72) Inventors: Per Holmberg, Stockholm (SE); Leif Johansson, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 107 days.

(21) Appl. No.: 17/276,234

(22) PCT Filed: Sep. 17, 2018

(86) PCT No.: PCT/SE2018/050936
§ 371 (c)(1),
(2) Date: Mar. 15, 2021

(87) PCT Pub. No.: WO2020/060450
PCT Pub. Date: Mar. 26, 2020

(65) Prior Publication Data
US 2022/0107895 A1 Apr. 7, 2022

(51) Int. Cl.
*G06F 12/0811* (2016.01)
*G06F 9/455* (2018.01)
(Continued)

(52) U.S. Cl.
CPC ...... *G06F 12/0811* (2013.01); *G06F 9/45558* (2013.01); *G06F 12/0842* (2013.01);
(Continued)

(58) Field of Classification Search
CPC ............. G06F 9/45558; G06F 12/0811; G06F 12/0842; G06F 12/1081; G06F 2009/45579; G06F 2009/45583
See application file for complete search history.

(56) References Cited

U.S. PATENT DOCUMENTS

| | | | |
|---|---|---|---|
| 2009/0077564 A1* | 3/2009 | Loeser | G06F 9/462 |
| | | | 718/108 |
| 2010/0169894 A1 | 7/2010 | Sheaffer et al. | |

(Continued)

FOREIGN PATENT DOCUMENTS

WO     2016059692 A1     4/2016

OTHER PUBLICATIONS

Indian Office Action dated Feb. 8, 2022 for Patent Application No. 202117016367, consisting of 7-pages.
(Continued)

*Primary Examiner* — Eric T Oberly
(74) *Attorney, Agent, or Firm* — Christopher & Weisberg, P.A.

(57) ABSTRACT

A processing system has at least one internal processing unit and associated memory. The memory is accessible by at least two other independent processing units, and the memory of the at least one internal processing unit includes a data structure shared by the at least two other independent processing units that are allowed to perform direct memory writes into the shared data structure. A dedicated set of one or more bits in the shared data structure is allocated to each one of the at least two other independent processing units, each bit or each group of bits in the shared data structure indicates a unique combination of independent processing unit and application handler for handling an application in relation to the corresponding independent processing unit. Preparation and/or activation of the application handler indicated by the set bit or the set group of bits is initiated.

19 Claims, 25 Drawing Sheets

(51) Int. Cl.
*G06F 12/0842* (2016.01)
*G06F 12/1081* (2016.01)

(52) U.S. Cl.
CPC .............. *G06F 12/1081* (2013.01); *G06F 2009/45579* (2013.01); *G06F 2009/45583* (2013.01)

(56) References Cited

U.S. PATENT DOCUMENTS

| | | | |
|---|---|---|---|
| 2015/0248554 A1* | 9/2015 | Dumitru | G06F 21/56 718/1 |
| 2017/0289109 A1* | 10/2017 | Caragea | H04L 9/3263 |
| 2018/0165107 A1* | 6/2018 | Elzur | G06F 9/45558 |

OTHER PUBLICATIONS

International Search Report and Written Opinion dated Aug. 9, 2019 for International Application No. PCT/SE2018/050936 filed Sep. 17, 2018, consisting of 18-pages.

* cited by examiner

BIT REGISTER IN SHARED MEMORY INDICATING THE PROCESSOR AND THE SOFTWARE HANDLERS

CROSS-REFERENCE TO RELATED APPLICATIONS

This application is a Submission Under 35 U.S.C. § 371 for U.S. National Stage Patent Application of International Application Number: PCT/SE2018/050936, filed Sep. 17, 2018 entitled "BIT REGISTER IN SHARED MEMORY INDICATING THE PROCESSOR AND THE SOFTWARE HANDLERS," the entirety of which is incorporated herein by reference.

TECHNICAL FIELD

The proposed technology generally relates to computers and processing technology, and more particularly to a processing system, a method of operating a processing system, an event-based processing system, as well as a corresponding computer program and computer-program product.

BACKGROUND

Computers and processing technology represent an intense field of research and development, and a lot of efforts are made world-wide to find new processing technology optimizations, e.g. to improve the operation and behaviour of processing systems and/or to improve the interworking of different units in processing systems.

By way of example, it is generally desirable to improve processing speed, reduce latencies and optimize the interworking between independent processing units in the same or different processing systems.

SUMMARY

It is a general object to provide new processing technology developments and optimizations.

It is a specific object to provide an improved processing system.

Another object is to provide a method of operating a processing system.

Yet another object is to provide an event-based processing system.

Yet another object is to provide a computer program for operating, when executed, a processing system, as well as a corresponding computer-program product.

These and other objects are met by embodiments of the proposed technology.

According to a first aspect, there is provided a processing system comprising at least one internal processing unit and associated memory. At least one area of the memory is accessible by at least two other independent processing units, and the at least one area of the memory of the at least one internal processing unit comprises a data structure shared by the at least two other independent processing units that are allowed to perform direct memory writes into the shared data structure. The processing system is configured to allocate a dedicated set of one or more bits in the shared data structure to each one of the at least two other independent processing units, wherein each bit or each group of bits in the shared data structure indicates a unique combination of i) independent processing unit and ii) application handler for handling an application in relation to the corresponding independent processing unit. The processing system is configured to initiate, in response to a direct memory write setting a bit or a group of bits in the shared data structure, preparation and/or activation of the application handler indicated by the set bit or the set group of bits.

In this way it is possible to prepare and/or activate, for an independent processing unit doing a direct memory write in the shared data structure, a corresponding application handler for handling an application in relation to the independent processing unit. For example, the independent processing unit can initiate prefetching of executable code for the application handler and/or dispatch the application handler by simply setting a bit or a group of bits in the shared data structure. This will enable operations to be handled in parallel, such as prefetching application handler code and/or local data needed for application processing concurrently with the transfer of application state and/or payload data for the application.

Traditionally, the reception and decoding of an entire message including information of the application and payload data must be completed before the relevant application handler can be called, leading to long latencies. Accordingly, the proposed technology offers great advantages, e.g. in terms of reduced latency through early preparation and/or activation of the indicated application handler, optimized interworking between processing units and/or higher overall processing speed.

Optionally, the direct memory write may initially trigger a power management wake-up operation of the at least one internal processing unit of the processing system.

A direct memory write generally involves writing information directly into the cache and/or other dedicated local memory of the at least one internal processing unit of the considered processing system.

By way of example, the shared data structure may be used for direct memory writes between separate hardware processing entities that can communicate over an interconnect, between separate processors in the same hardware processing entity, between virtual machines executing on the same processor, or between executable applications within the same virtual or physical processor or any combination of these.

According to a second aspect, there is provided a method of operating a processing system comprising at least one internal processing unit and associated memory. The method comprises:

enabling at least one area of the memory of the at least one internal processing unit to be accessible by at least two other independent processing units, wherein the at least one area of the memory comprises a data structure shared by the at least two other independent processing units that are allowed to perform direct memory writes into the shared data structure;

allocating, to each one of the at least two other independent processing units, a dedicated set of one or more bits in the shared data structure, wherein each bit or each group of bits in the shared data structure represents a unique combination of i) independent processing unit and ii) application handler for handling an application in relation to the corresponding independent processing unit; and initiating, in response to a direct memory write setting a bit or a group of bits in the shared data structure, preparation and/or activation of the application handler represented by the set bit or the set group of bits.

According to a third aspect, there is provided an event-based processing system comprising at least one internal processing unit and associated memory. At least one area of the memory is accessible by at least two other independent processing units, and the at least one area of the memory of the at least one internal processing unit comprises a data structure shared by said at least two other independent processing units that are allowed to perform direct memory writes into the shared data structure. The event-based processing system is configured to allocate, to each one of the at least two other independent processing units, a dedicated set of one or more bits in the shared data structure, wherein each bit or each group of bits in the shared data structure indicates a unique combination of i) independent processing unit and ii) event handler for handling an event originating from the independent processing unit. The event-based processing system is also configured to initiate, in response to a direct memory write setting a bit or a group of bits in the shared data structure, preparation and/or activation of the event handler indicated by the set bit or the set group of bits.

According to a fourth aspect, there is provided a computer program for operating, when executed, a processing system comprising at least one internal processing unit and associated memory. The computer program comprises instructions, which when executed by at least one processor, cause the at least one processor to:
  enable at least one area of the memory of the at least one internal processing unit to be accessible by at least two other independent processing units, wherein the at least one area of the memory comprises a data structure shared by the at least two other independent processing units that are allowed to perform direct memory writes into the shared data structure;
  allocate, to each one of the at least two other independent processing units, a dedicated set of one or more bits in the shared data structure, wherein each bit or each group of bits in the shared data structure represents a unique combination of i) independent processing unit and ii) application handler for handling an application in relation to the corresponding independent processing unit; and
  initiate, in response to a direct memory write setting a bit or a group of bits in the shared data structure, preparation and/or activation of the application handler represented by the set bit or the set group of bits.

According to a fifth aspect, there is provided a computer-program product comprising a computer-readable medium having stored thereon such a computer program.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Throughout the drawings, the same reference designations are used for similar or corresponding elements.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

As previously mentioned, it is generally desirable to improve the operation and behaviour of processing systems and/or to improve the interworking of independent processing units in the same or different processing systems.

The proposed technology will now be described with reference to specific non-limiting examples.

Figure 1A:
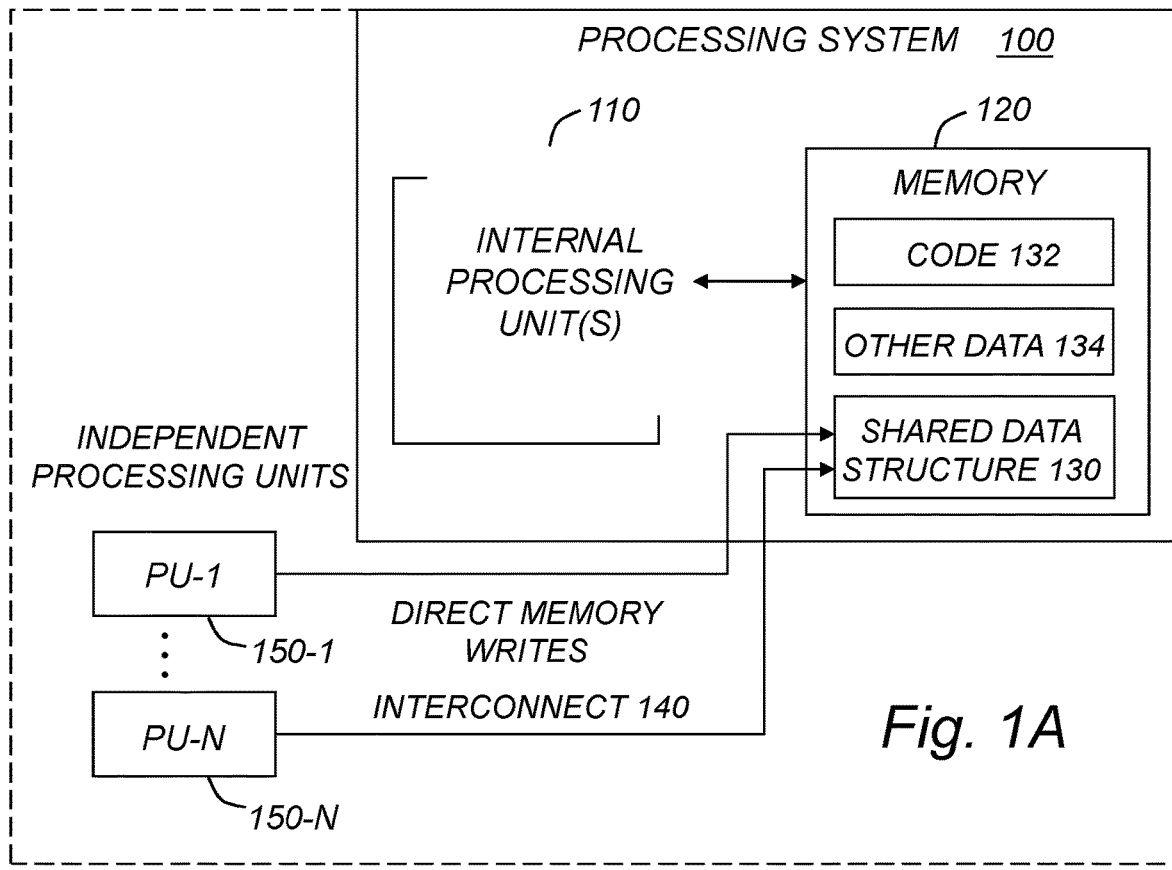
FIG. 1A is a schematic diagram illustrating an example of a processing system according to an embodiment.

FIG. 1A is a schematic diagram illustrating an example of a processing system according to an embodiment.

The processing system 100 comprises at least one internal processing unit 110 and associated memory 120. At least one area of the memory 120 is accessible by at least two other independent processing units 150-1, . . . , 150-N, also referred to as PU-1, . . . , PU-N, and the at least one area of the memory 120 of the at least one internal processing unit 110 comprises a data structure 130 shared by the at least two other independent processing units 150 that are allowed to perform direct memory writes into the shared data structure. The processing system 100 is configured to allocate a dedicated set of one or more bits in the shared data structure 130 to each one of the at least two other independent processing units, wherein each bit or each group of bits in the shared data structure 130 indicates a unique combination of i) independent processing unit 150 and ii) application handler for handling an application in relation to the corresponding independent processing unit. The processing system is configured to initiate, in response to a direct memory write setting a bit or a group of bits in the shared data structure, preparation and/or activation of the application handler indicated by the set bit or the set group of bits.

Figure 1B:
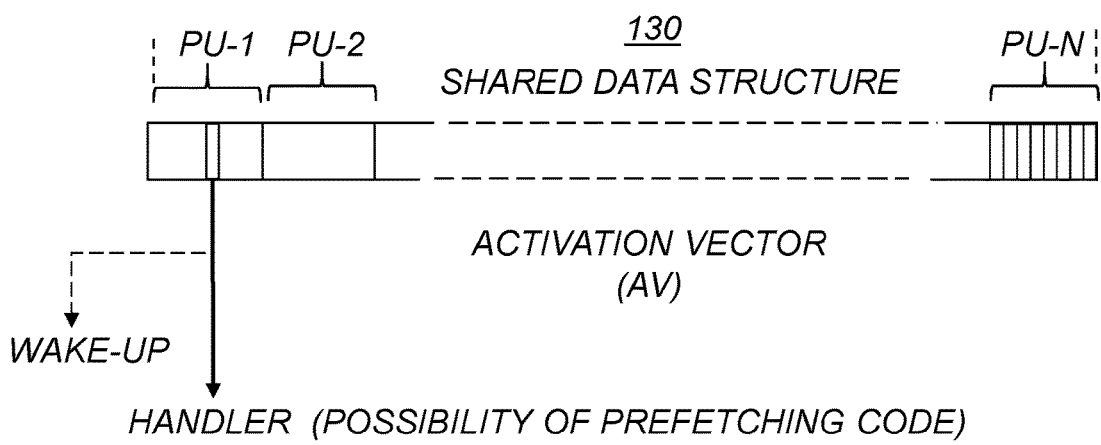
FIG. 1B is a schematic diagram illustrating an example of a shared data structure with dedicated areas to the independent processing units according to an embodiment.

FIG. 1B is a schematic diagram illustrating an example of a shared data structure with dedicated areas to the independent processing units according to an embodiment.

In this way it is possible to prepare and/or activate, for an independent processing unit doing a direct memory write in the shared data structure, a corresponding application handler for handling an application in relation to the independent processing unit. For example, the independent processing unit can initiate prefetching of executable code for the application handler and/or dispatch the application handler by simply setting a bit or a group of bits in the shared data structure. This will enable operations to be handled in parallel, such as prefetching application handler code and/or local data needed for application processing concurrently with the transfer of application state and/or payload data for the application.

The proposed technology offers great advantages, e.g. in terms of reduced latency through early preparation and/or activation of the indicated application handler, optimized interworking between processing units and/or higher overall processing speed. By way of example, for communication applications, this enables low latency communications.

It should be understood that the application handler may be an integral part of the overall application, and in a sense the application handler may thus be regarded as integrated with the application. This type of direct memory access is especially useful for allowing a communication protocol to be integrated with the corresponding application in which the communication protocol is to be used. Examples include message or event handlers for receiving and handling a message including data payload to be used in an overall application.

Optionally, the direct memory write may initially trigger a power management wake-up operation of the at least one internal processing unit of the processing system.

It should be understood that the memory 120 of the at least one internal processing unit 110 may include one or more additional memory areas, such as a memory area 132 for code and/or a memory area 134 for other data. The memory area 132 for code may include executable code for one or more application handlers.

A direct memory write generally involves writing information directly into the cache and/or other dedicated local memory of the at least one internal processing unit of the considered processing system.

By way of example, the shared data structure may be used for direct memory writes between separate hardware processing entities that can communicate over an interconnect, between separate processors in the same hardware processing entity, between virtual machines executing on the same processor, or between executable applications within the same virtual or physical processor or any combination of these.

It should thus be understood that the independent processing units 150 may be remote processing units separately located but operatively connected to the processing system 100. Alternatively, the independent processing units 150 may be an integrated part of the processing system 100, as indicated by the dashed line in FIG. 1A.

By way of example, the at least one internal processing unit 110 may therefore be a physical and/or logical processing unit and the at least two independent processing units 150 may be physical and/or logical processing units.

For example, as mentioned, the at least two independent processing units 150 may be remote processing units allowed to perform direct memory writes into the shared data structure 130.

In a particular example, the at least one internal processing unit 110 may be a virtual machine or container executing on at least one processor and/or the at least two independent processing units 150 may be virtual machines and/or containers executing on at least one processor.

The at least one internal processing unit 110 and the at least two independent processing units 150 may even be virtual machines and/or containers executing on the same processor.

As an example, the at least two independent processing units 150 are preferably independently startable and manageable processing units.

As previously indicated, the at least one internal processing unit 110 and the independent processing units 150 may be physically centralized in the same location.

For example, the at least one internal processing unit 110 and the independent processing units 150 may be represented by computers, servers and/or processors within a data center.

Optionally, the at least one internal processing unit 110 and the independent processing units 150 may be represented by remotely connected computers, servers and/or processors.

By way of example, the at least one internal processing unit 110 and the independent processing units 150 may be configured to communicate based on an interconnect 140 using direct links and/or indirect links between the processing units.

In a particular example, the interconnect 140 may be based on Peripheral Component Interconnect, PCI, and/or Ethernet technology.

Normally, each application handler is defined by application handler code accessible from memory 120 for execution by the at least one internal processing unit 110.

For example, an application handler may be configured for handling a communication service protocol in relation to the corresponding independent processing unit.

As previously indicated, the at least one internal processing unit 110 may be configured to prefetch and/or call executable code for the indicated application handler.

In a particular example, the at least one internal processing unit 110 may be configured to poll the shared data structure 130 in response to a direct memory write setting a bit or a group of bits in the shared data structure 130 to determine which application handler to prepare and/or activate.

As will be described in more detail with reference to the example of FIG. 7, the memory 120 of the at least one internal processing unit 110 may further comprise, for each combination of independent processing unit and application handler, an application state (APP STATE) area and a corresponding data area (DATA PAYLOAD). In this example, each bit or group of bits further represents an application state area in the memory 120 for storing information about the state of transfer of data from the corresponding independent processing unit 150 to be used in execution of the application handler. The processing system 100 may thus be configured to poll the indicated application state area (APP STATE) to detect completion of transfer of data, e.g. to detect a state change indicating reception of a message (i.e. write of the message).

Wake-Up as Part of the Activation

As previously indicated, the processing system 100 may optionally be configured to trigger power management wake-up of the at least one internal processing unit 110 in response to the direct memory write setting a bit or a group of bits in the shared data structure 130.

Since a direct memory write in the shared data structure 130 may initiate preparation and/or activation of the application handler, and optionally also trigger or activate power management wake-up, the shared data structure may also be referred to as an activation data structure or simply an activation vector (AV).

For example, the shared data structure 130 may be represented as a bit vector with a dedicated set of one or more bits for each one of the at least two independent processing units 150. Preferably, the at least one internal processing unit 110 may thus be enabled to perform vector operations on the shared data structure 130.

In a particular example, the shared data structure 130 is represented by a cache line, and the processing system 100 is configured to scan the shared data structure 130 for direct memory writes using cache line monitoring support in the processing system.

Figure 11:
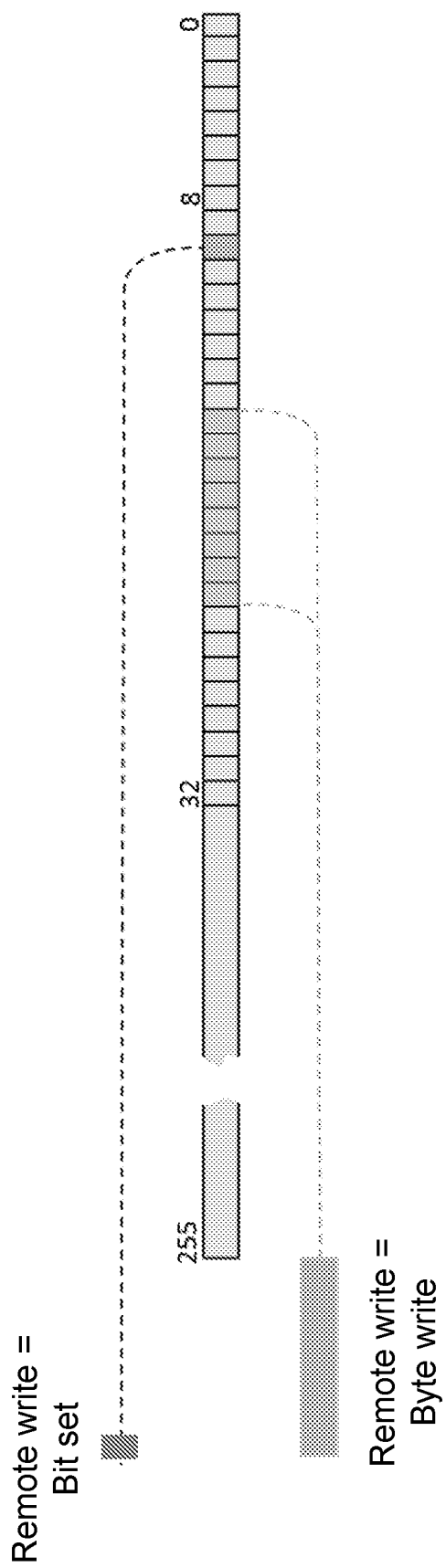
FIG. 11 is a schematic diagram illustrating a specific example of a shared data structure according to an embodiment.
Figure 13:
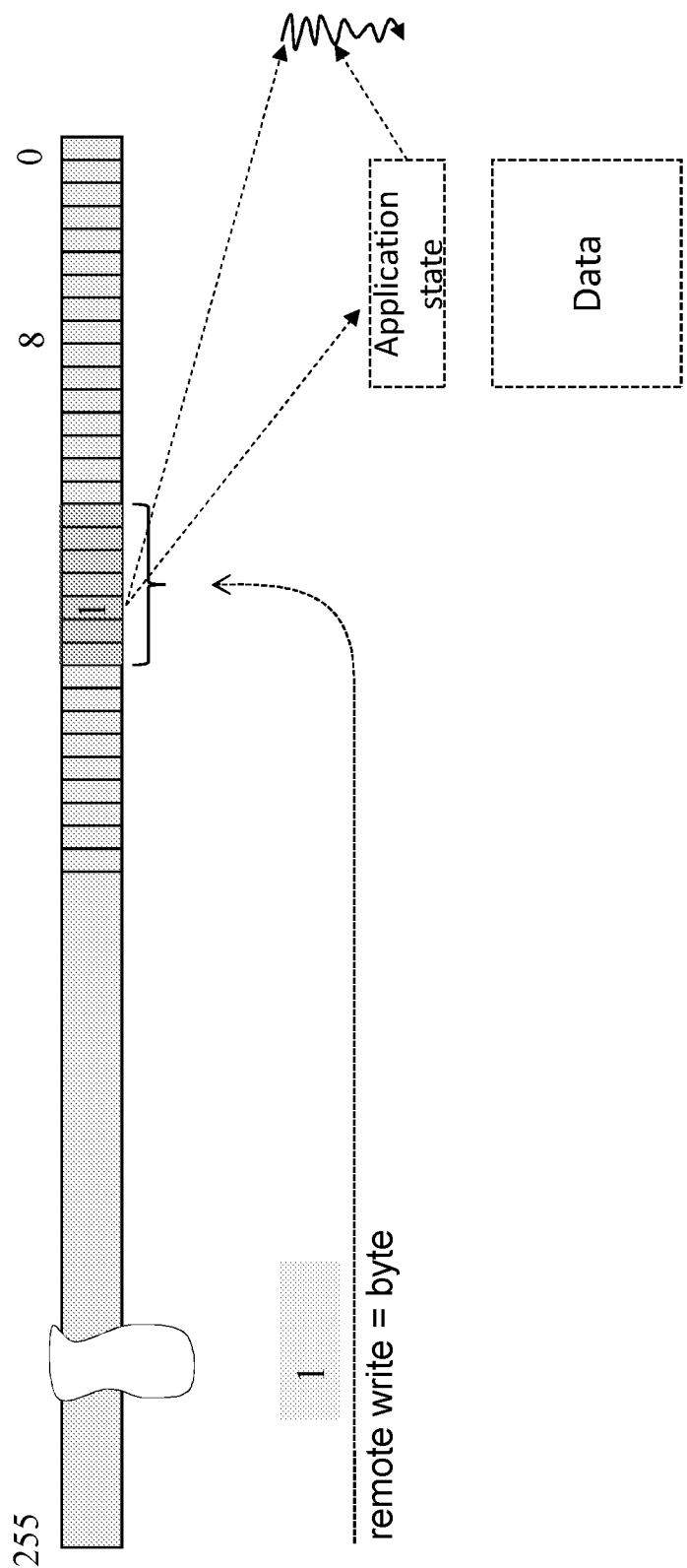
FIG. 13 is a schematic diagram illustrating another specific example of a shared data structure in which a direct byte write setting one or more bits initiates preparation and/or execution of an application handler according to an embodiment.

It should also be understood that the processing system 100 may be configured to perform byte-wise allocation of bits or groups of bits in the shared data structure 130, where each independent processing unit 150 is allocated at least one dedicated byte of the shared data structure, e.g. as can be seen from FIG. 11 and FIG. 13.

Figure 9:
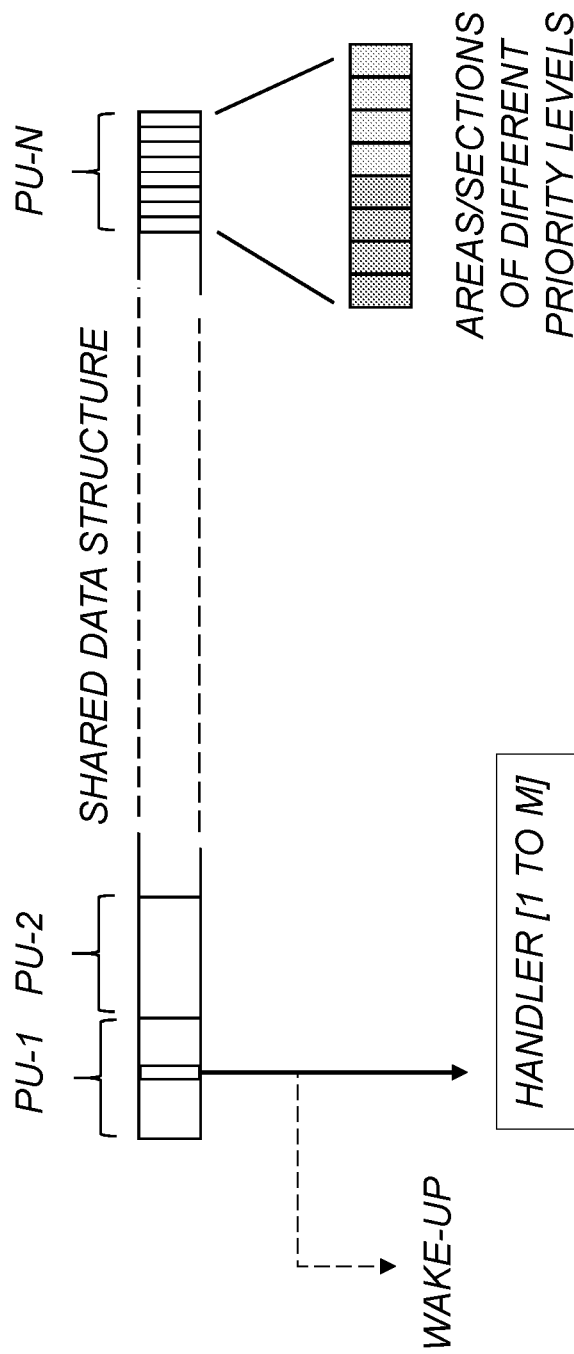
FIG. 9 is a schematic diagram illustrating an example of a shared data structure with dedicated areas to independent processing units, where each dedicated area has sections representing different priority levels according to an embodiment.

Optionally, the dedicated set of bits for each of the at least two independent processing units 150 may include at least two areas representing different priority levels, e.g. as can be seen from FIG. 9. For example, there may be two different priority levels, e.g. one normal priority level for "data traffic" and a higher for emergencies that need to bypass traffic (e.g. faults and congestion control).

In optional embodiments, there may be several shared data structures, for various reasons.

Figure 14:
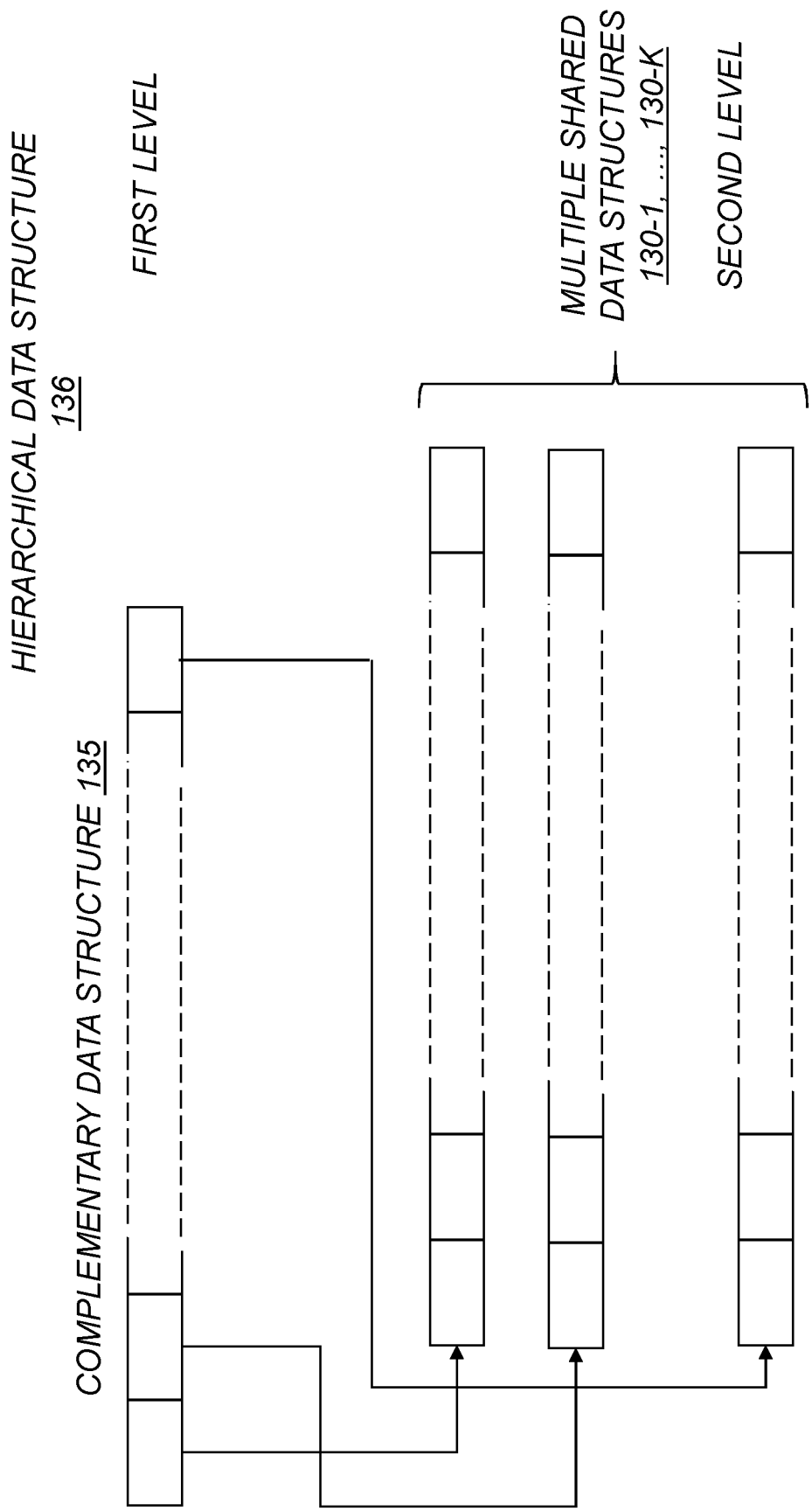
FIG. 14 is a schematic diagram illustrating an example of a hierarchical data structure according to an embodiment.
Figure 15:
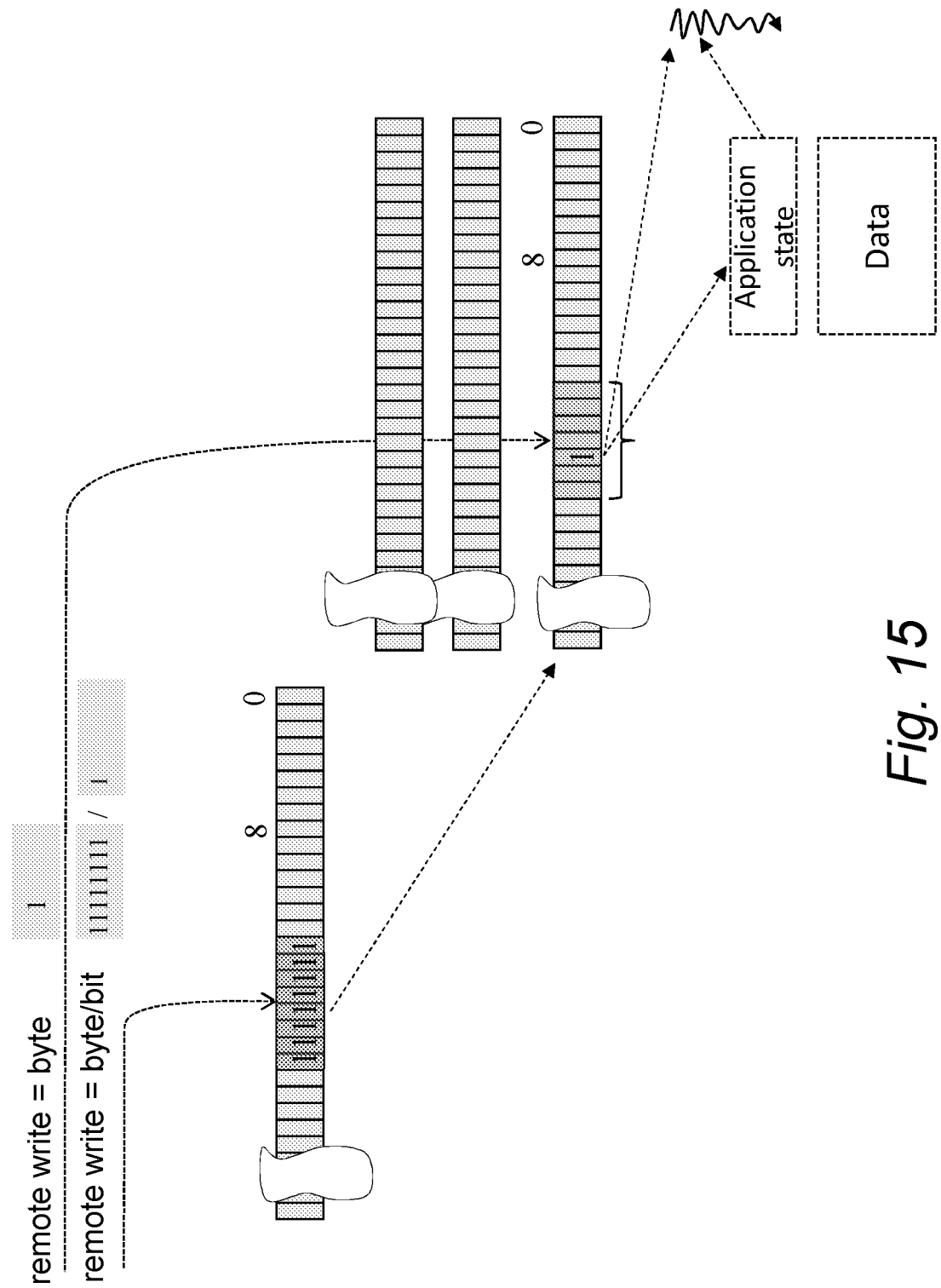
FIG. 15 is a schematic diagram illustrating a particular example of a hierarchical data structure according to an embodiment.

In a particular example, as illustrated in the examples of FIG. 14 and FIG. 15, the shared data structure 130 may be part of an overall hierarchical data structure 136 arranged in at least two levels, wherein the hierarchical data structure 136 comprises multiple shared data structures 130-1, . . . , 130-K and a complementary data structure 135 on a higher level than the multiple shared data structures. The complementary data structure 135 may include groups of one or more bits, each group of one or more bits pointing to a specific one of said multiple shared data structures 130-1, . . . , 130-K, and each bit or each group of bits in the specific shared data structure indicates a unique combination of i) independent processing unit and ii) application handler. The processing system 100 may be configured to scan the complementary data structure 135 for a direct memory write to determine which specific shared data structure 130 that is pointed to by the direct memory write in the complementary data structure. The processing system 100 may also be configured to scan the specific shared data structure 130 for a direct memory write to determine which application handler that is indicated by the direct memory write in the specific shared data structure.

In another example, it should also be pointed out that the processing system 100 may comprise at least two shared data structures 130, . . . , 130-J for application handler preparation and/or activation, one shared data structure for each of a number J of execution cores and/or threads corresponding to processing units in the processing system. Normally, an execution thread corresponds to the execution performed by a processing unit, and accordingly there is a mapping between threads and processing units. In other words, with several internal processing units 110 in the overall processing system, there may be several shared data structures, operating as activation vectors.

In a sense, the proposed technology may be regarded as an event-based processing system that comprises at least one internal processing unit and associated memory, and wherein at least one area of the memory is accessible by at least two other independent processing units, and the at least one area of the memory of the at least one internal processing unit comprises a data structure shared by said at least two other independent processing units that are allowed to perform direct memory writes into the shared data structure. The event-based processing system is thus configured to allocate, to each one of the at least two other independent processing units, a dedicated set of one or more bits in the shared data structure, wherein each bit or each group of bits in the shared data structure indicates a unique combination of i) independent processing unit and ii) event handler for handling an event originating from the independent processing unit. The event-based processing system is further configured to initiate, in response to a direct memory write setting a bit or a group of bits in the shared data structure, preparation and/or activation of the event handler indicated by the set bit or the set group of bits.

An event handler may include any executable set of instructions or code for handling, when executed, an event originating from an independent processing unit, such as an incoming message or transaction or an event triggered by an incoming message or transaction.

For example, such an event-based processing system may be configured to prefetch and/or call executable code for the indicated event handler in response to the direct memory write.

In a sense, the shared data structure 130 may thus be used as common activation for all communication to a receiving application program executed by the processing unit 110, wherein each communication is represented by a bit or a group of bits in the shared data structure 130 that can be updated with a direct memory write from one of the independent processing units 150. When the bit is set the receiving application program executed by the internal processing unit(s) 110 knows which protocol to execute and optionally the memory location for the data to operate on. A remote write from an independent processing unit 150 setting a bit in the shared data structure 130 will thus indicates a start of communication in that the bit position in the shared data structure 130 maps directly to which application or protocol software to execute, and optionally to a specific state area for that application or protocol.

For example, a direct memory write in the shared data structure 130 may indicate that an independent processing unit 150 will send a message to the event-based processing system for execution by the indicated event handler.

In a particular example, a direct memory write may activate a scan of the shared data structure to find the event and initiate one or more activities in response to the direct memory write. In a sense, this corresponds to detecting an incoming event notification and determining which code to execute and possibly which data to operate on.

As described herein, a communication mechanism implemented by direct memory writes addressed into the memory of a receiving processing unit allows combining operations that are logically not related, allowing them to be handled in parallel.

The proposed technology sets forth an efficient mechanism for supporting processing systems such as event-based systems like communication systems and transaction systems. In an event-based system an event notification triggers the processing, typically in the form of an arriving message or signal on a network interface using a communication channel.

For example, base station applications may be implemented as event-based systems having both time-triggered events and events triggered by incoming messages. The base station application typically needs a low overhead in communication as implemented by a remote write directly into a receiving programs' memory. To get low latency for the whole operation, it is desirable to find an efficient solution to detect events and scheduling the proper code for handling the events.

In a particular example, the shared data structure described herein may be used with such a low overhead direct-write-based communication mechanism to optimize the dispatching of the right event handler and starting the execution of the handler, e.g. to optimize the polling procedure itself, the scheduling and fetching of the code of the event handler and/or allowing for a low latency power management.

The shared data structure will work for current and future processors as long as a basic direct memory write operation is available, e.g. in any compute cluster or any cloud software that provides such operation. Cloud-based systems can also benefit from the low latency power management provided by the activation mechanism of the shared data structure. The proposed technology may be useful in network applications, e.g. suitable for radio base station applications, but many other systems that start leveraging direct remote write communication can benefit in both compute efficiency and power efficiency, for example web applications, transaction systems and database systems that often have varying and burst workloads.

Alternatively, the proposed technology may be regarded as an application scheduler configured to trigger execution of one or more application handlers based on the information in the shared data structure.

By way of example, the application scheduler may be configured to poll the shared data structure for bits or groups of bits. For example, the application scheduler may wake up and poll when a remote processing unit writes to the shared data structure. The application scheduler may continue to scan the shared data structure until all the bits in the data structure has been handled, and possibly cleared. An empty data structure can trigger the application handler to enter sleep mode.

In a particular example, the application handler, triggered to execute by the application scheduler, may be responsible to:
  a. Prepare the internal processing unit(s) 110 of the processing system 100 for incoming message(s).
  b. Scan the incoming message(s) until all messages are handled in a proper way.
  c. Possibly yield if the work cannot be done within a time limit.
  d. Clear the corresponding bit or group of bits in the shared data structure 130 and terminate application handler execution.

As can be seen, technical expressions such as "application handler" and "event handler" may be used to describe a function for handling an application or an incoming event or transaction that may be considered as part of an application. Sometimes, the expression "protocol handler" will also be used for the same or similar technical features, especially when the handler function relates to a type of communication protocol or communication mechanism involving transfer of a message or similar signal, which in turn may carry payload data to be used in an overall application.

Figure 2:
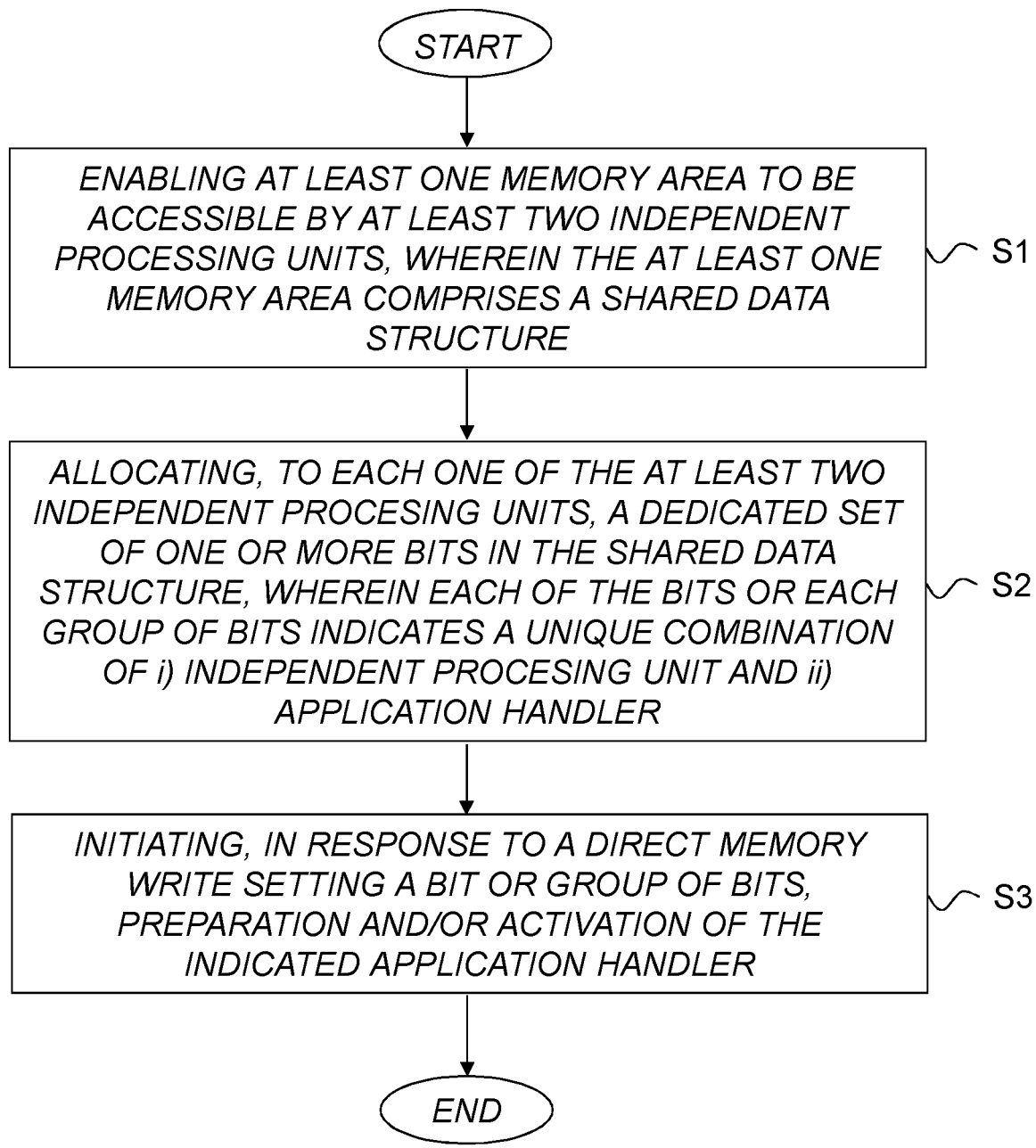
FIG. 2 is a schematic flow diagram illustrating an example of a method for operating a processing system according to an embodiment.

FIG. 2 is a schematic flow diagram illustrating an example of a method for operating a processing system comprising at least one internal processing unit and associated memory according to an embodiment.

Basically, the method comprises:

S1: enabling at least one area of the memory of the at least one internal processing unit to be accessible by at least two other independent processing units, wherein the at least one area of the memory comprises a data structure shared by the at least two other independent processing units that are allowed to perform direct memory writes into the shared data structure;

S2: allocating, to each one of the at least two other independent processing units, a dedicated set of one or more bits in the shared data structure, wherein each bit or each group of bits in the shared data structure represents a unique combination of i) independent processing unit and ii) application handler for handling an application in relation to the corresponding independent processing unit; and S3: initiating, in response to a direct memory write setting a bit or a group of bits in the shared data structure, preparation and/or activation of the application handler represented by the set bit or the set group of bits.

As previously mentioned, the at least one internal processing unit may be a physical and/or logical processing unit and the at least two independent processing units may also be physical and/or logical processing units.

For example, the at least two independent processing units may be remote processing units allowed to perform direct memory writes into the shared data structure.

In a particular example, the at least one internal processing unit may be a virtual machine or container executing on at least one processor and/or the at least two independent processing units may be virtual machines and/or containers executing on at least one processor.

Preferably, the at least two independent processing units may be independently startable and manageable processing units.

BY way of example, each application handler may be defined by application handler code accessible from memory for execution by the at least one internal processing unit.

Figure 3:
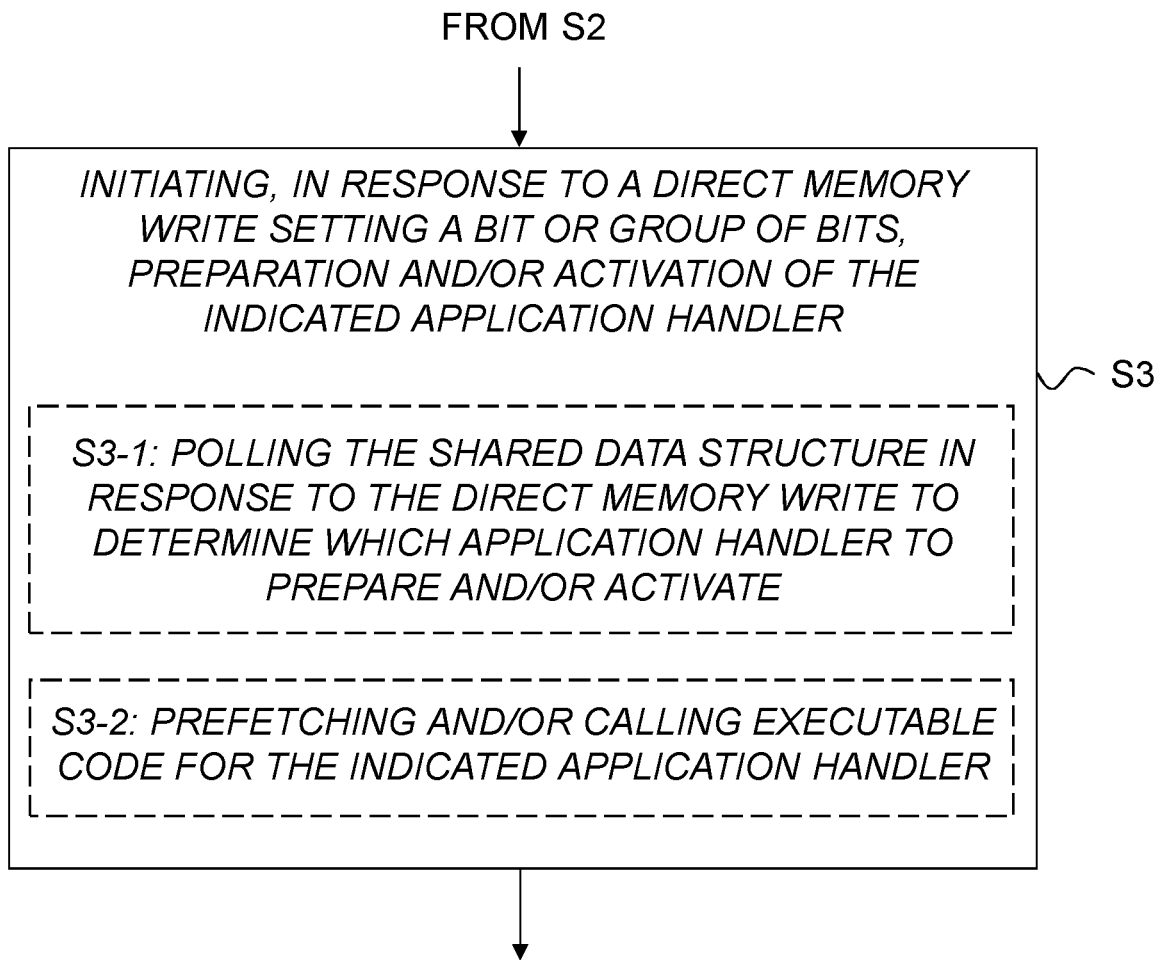
FIG. 3 is a schematic flow diagram illustrating a particular example of the initiating step according to an embodiment.

FIG. 3 is a schematic flow diagram illustrating a particular example of the initiating step according to an embodiment.

In this example, the initiating step S3 optionally comprises polling S3-1 the shared data structure in response to a direct memory write setting a bit or a group of bits in the shared data structure to determine which application handler to prepare and/or activate.

Further, the initiating step S3 may optionally comprise prefetching and/or calling S3-2 executable code for the indicated application handler.

As an example, the memory 120 of the at least one internal processing unit 110 may further comprise, for each combination of independent processing unit and application handler, an application state area and a corresponding data area. Each bit or each group of bits may thus further represent an application state area in the memory 120 for storing information about the state of transfer of data from the corresponding independent processing unit 150 to be used in execution of the application handler, wherein completion of transfer of data is detected by polling the indicated application state area.

For example, the set bit or the set group of bits provides, before the independent processing unit 150 performs writes in the application state area and corresponding data area, information about i) the independent processing unit 150, ii) which application handler to be executed and optionally iii) which application state area to poll.

Figure 4:
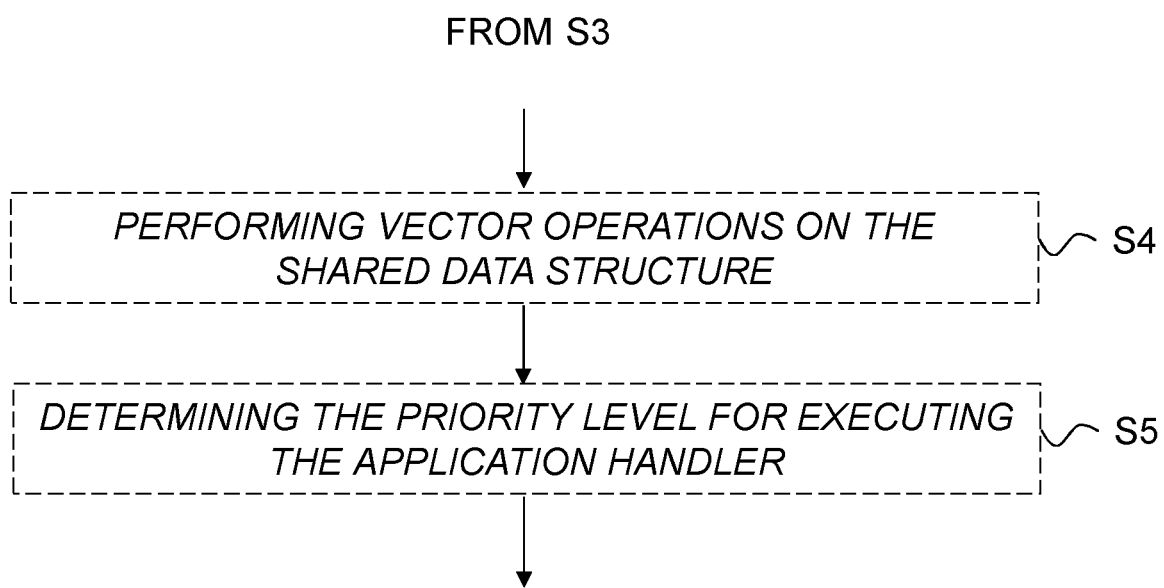
FIG. 4 is a schematic flow diagram illustrating an example of further optional steps according to an embodiment.

FIG. 4 is a schematic flow diagram illustrating an example of further optional steps according to an embodiment.

According to an example, the shared data structure 130 may be represented as a bit vector with a dedicated set of one or more bits for each one of said at least two independent processing units, and the method may further comprise performing S4 vector operations on the shared data structure.

In another example, each bit or each group of bits in the shared data structure 130 may represent a selected one of a number of priority levels for executing the corresponding application handler, and the method may further comprise determining S5 the priority level for executing the application handler based on the set bit or the set group of bits.

In a particular example, the shared data structure 130 may be represented by a cache line, and the shared data structure 130 may be scanned for direct memory writes using cache line monitoring support in the processing system 100.

Optionally, the step S2 of allocating a dedicated set of one or more bits in the shared data structure may be based on byte-wise allocation, where each independent processing unit 150 is allocated at least one dedicated byte of the shared data structure.

Figure 5:
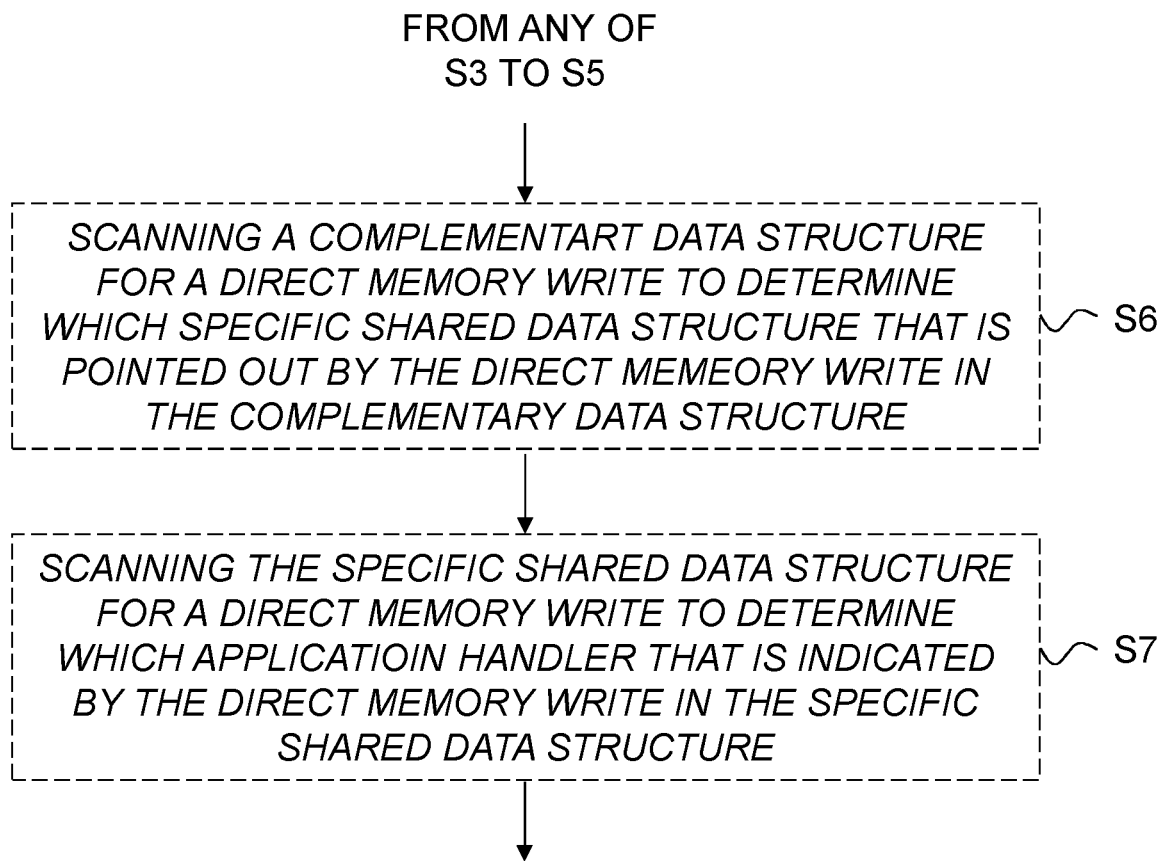
FIG. 5 is a schematic flow diagram illustrating an example of further optional steps according to another embodiment.

FIG. 5 is a schematic flow diagram illustrating an example of further optional steps according to another embodiment. In this example, the shared data structure is part of an overall hierarchical data structure arranged in at least two levels, wherein the hierarchical data structure comprises multiple shared data structures and a complementary data structure on a higher level than the multiple shared data structures. The complementary data structure includes groups of one or more bits, each group of one or more bits pointing to a specific one of the multiple shared data structures, wherein each bit or each group of bits in the specific shared data structure indicates a unique combination of i) independent processing unit and ii) application handler. In this particular example, the method further comprises:

scanning S6 the complementary data structure for a direct memory write to determine which specific shared data structure that is pointed to by the direct memory write in the complementary data structure; and scanning S7 the specific shared data structure for a direct memory write to determine which application handler that is indicated by the direct memory write in the specific shared data structure.

Figure 6:
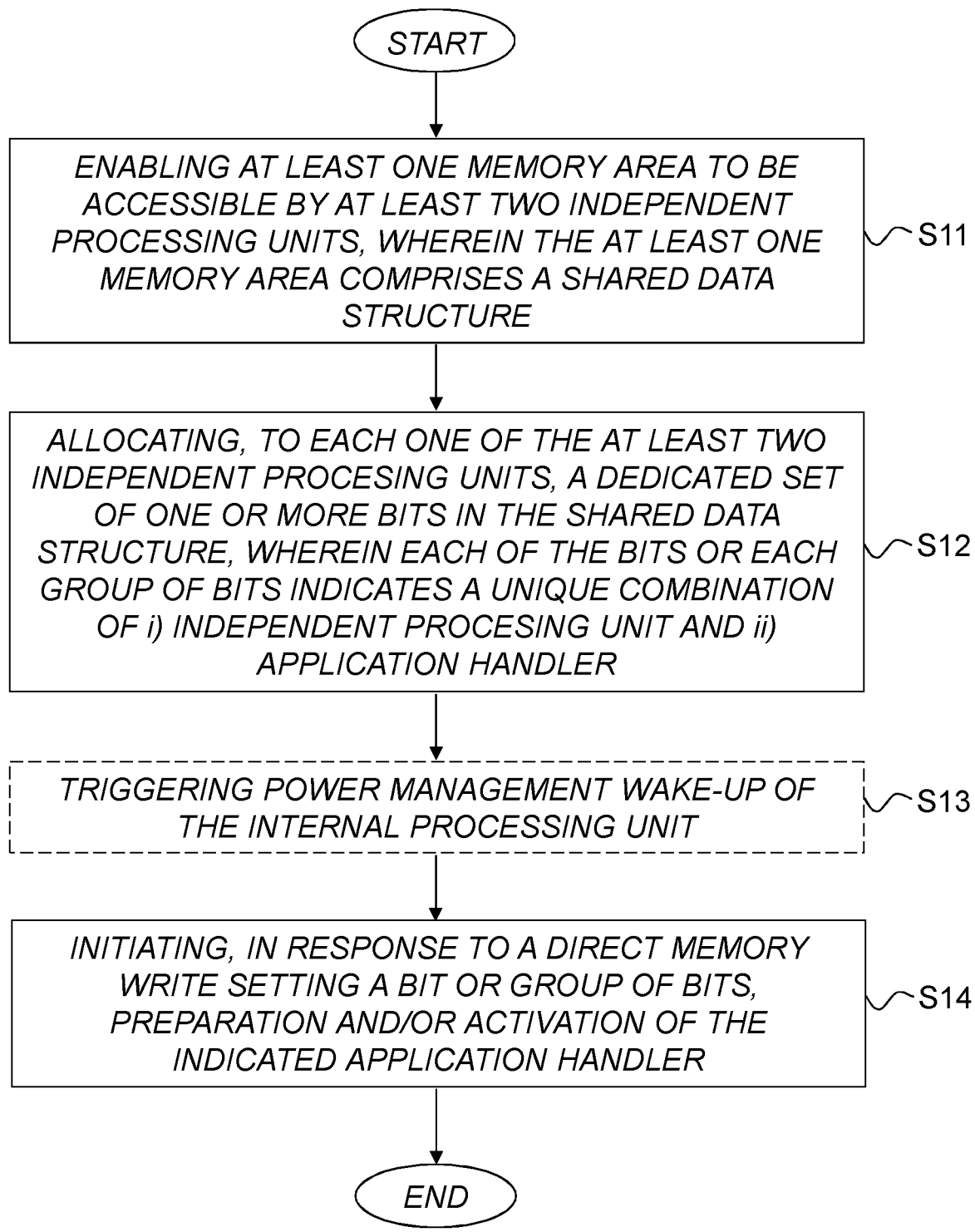
FIG. 6 is a schematic flow diagram illustrating an example of a method for operating a processing system according to an embodiment.

FIG. 6 is a schematic flow diagram illustrating another example of a method for operating a processing system according to an embodiment. In this example, in addition to the steps S11, S12 and S14 corresponding to the previously described steps S1, S2 and S3, respectively, the method may further comprise the optional step S13 of triggering power management wake-up of the at least one internal processing unit in response to the direct memory write setting a bit or a group of bits in the shared data structure 130. This step S13 of triggering power management wake-up is normally performed before the step S14.

Figure 7:
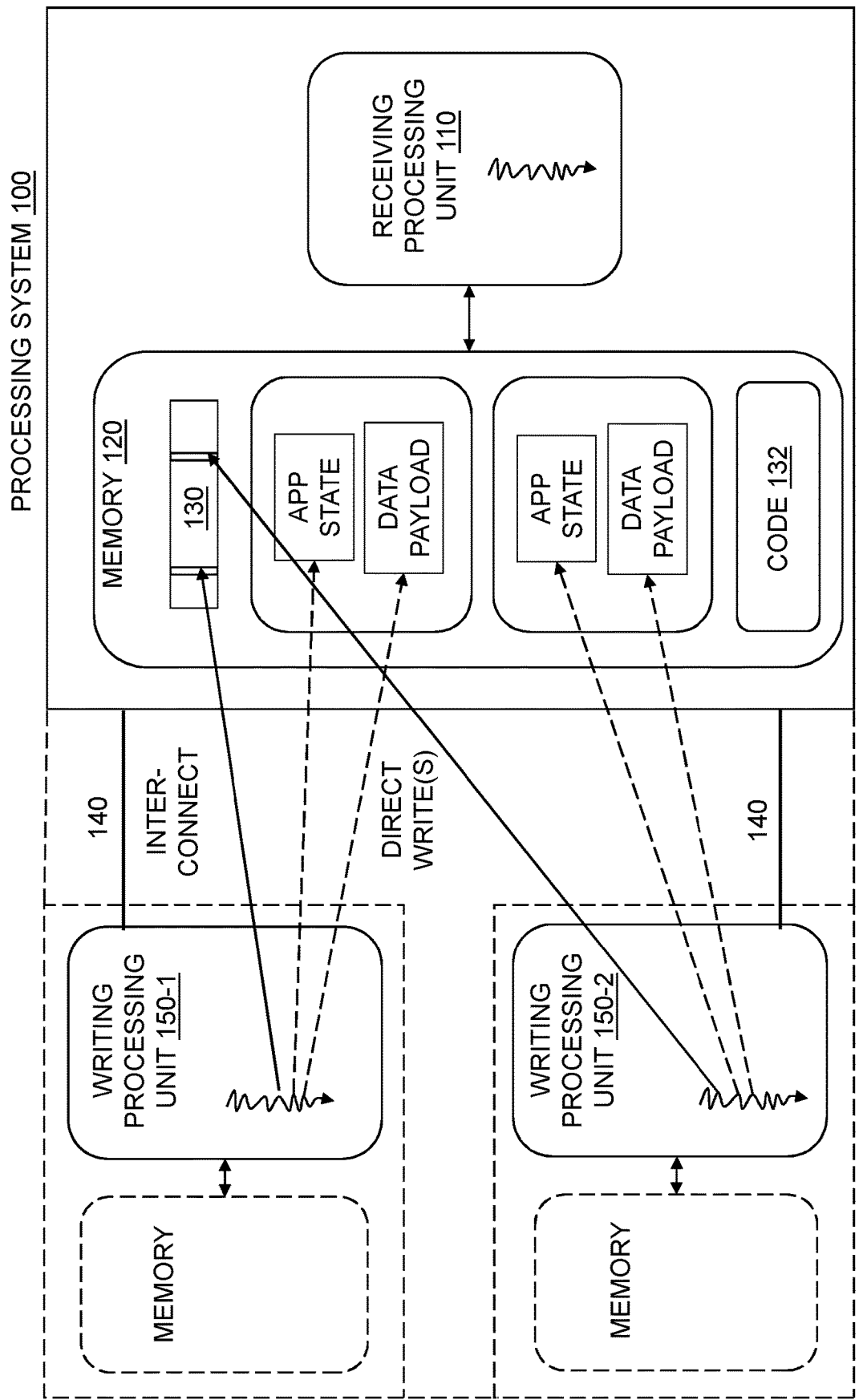
FIG. 7 is a schematic block diagram illustrating a particular example of a scenario with two or more writing processing units performing direct memory writes into a shared data structure of at least one receiving processing unit according to an embodiment.

FIG. 7 is a schematic block diagram illustrating a particular example of a scenario with two or more writing processing units performing direct memory writes into a shared data structure of at least one receiving processing unit according to an embodiment. In this particular example, two independent processing units 150-1, 150-2, referred to as writing processing units, are allowed to perform direct memory writes into the memory 120 of a so-called receiving processing unit 110. By way of example, the direct memory writes from the writing processing units 150-1, 150-2 may be initiated during execution of programs and/or threads by these processing units 150, as and when called for by the executed program and/or thread. Each of the independent processing units 150-1, 150-2 normally has an associated memory.

The independent processing units 150-1, 150-2 may be part of the same overall processing system 100 in which the receiving processing unit 110 is located. Alternatively, the independent processing units 150-1, 150-2 may belong to one or more separate processing systems.

As mentioned above, the considered processing units may be configured to communicate based on an interconnect 140. By way of example, the processing units may be connected using PCIexpress, e.g. through a PCIexpress non-transparent bridge. This specifically enables the possibility to have the data structure directly within user space of the receiver, where updates from PCI express can still be done without requiring Operating System (OS) or hypervisor intervention, causing interrupts, Virtual Machine (VM) exits and so forth. A non-transparent bridge provides basic fault isolation, i.e. a fault in processing unit B cannot cause processing unit A to hang. This is not necessary for providing scalability but for achieving high availability and resilience at hardware and/or software faults.

PCIexpress is very low latency and also low cost, but has limited scalability. PCIe systems can typically include a few units, or a few tenths of units when using a switch.

Another alternative implementation can be based on Remote Direct Memory Access (RDMA) and/or RDMA over Converged Ethernet (RoCE), which is a network protocol that allows RDMA over an Ethernet network. This is supported by high-end network adapters for Infiniband or converged Ethernet. These solutions are highly scalable (thousands of nodes) but also very costly.

The memory 120 of the receiving processing unit 110 includes a shared data structure 130, as described herein, and referred to as an activation vector. A direct memory write setting a bit or a group of bits in the activation vector 130 by one of the writing processing units 150 will point out an application handler for handling an executable application and allow preparation and/or activation of the application handler. For example, prefetching executable code 132 for the application handler may be performed in response to the direct memory write so that the application handler is ready for execution when the data payload for the application has been transferred. For this purpose, the memory 120 of the receiving processing unit 110 may also include, for each writing processing unit 150, a memory area for application state (APP state) indicating the state or status of the transfer of payload data, as well as a memory area for the corresponding payload data itself.

In a sense, the activation vector 130 is shared between writing programs executing on one or more independent processing units 150-1, 150-2 that can update a bit or bits within the same activation vector 130 of a receiving processing unit. This shared data structure, i.e. the activation vector, is mapped and writeable for all executable programs or threads in those processing units that can direct/remote write to the considered application program in a receiving processing unit, and each bit or defined bit group within the shared data structure represents a unique combination of a writing processing unit and application/protocol handler to be activated.

It should be understood that the considered overall processing system may be a multi-threaded and/or multi-core processing system with any arbitrary number of processing units, also referred to as cores. For example, executable applications may be single-threaded or multi-threaded, i.e. using one or more processing units. In addition, the processing system may also execute two or more independent applications, each of which may be executed by one or more processing units, while sharing memory.

By way of example, the direct memory communication may be from thread to thread, i.e. an execution thread on a processor or corresponding hardware may perform direct writes of information to another specific execution thread, where an activation vector as described herein may be associated to the latter specific execution thread.

Figure 8:
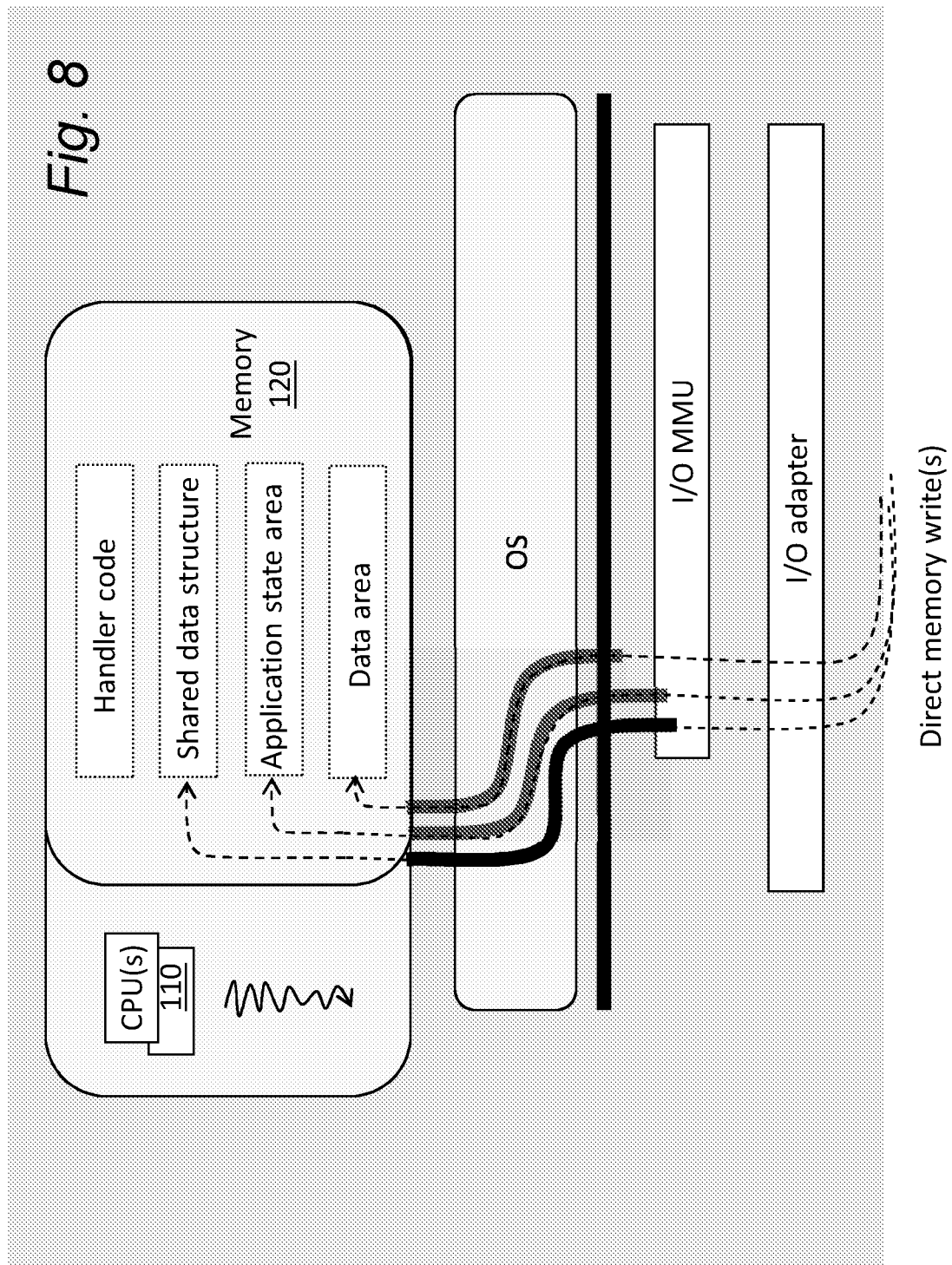
FIG. 8 is a schematic diagram illustrating an example of a processing unit/system having a shared data structure for direct memory writes from two or more independent processing units according to an embodiment.

FIG. 8 is a schematic diagram illustrating an example of a processing unit/system having a shared data structure for direct memory writes from two or more independent processing units according to an embodiment.

Expressed slightly differently, the overall software model includes communication directly on the application level where an application opens up a "window" to its memory, holding one or more data structures to be directly writeable from other units. The application may be handled and/or defined by application handler code residing in memory.

With reference to FIG. 8, the application may open a shared data structure in its memory 120 to operate as the activation vector described herein. Optionally, the application may also open its own memory 120 for application state and/or application/protocol payload, e.g. in an application state area and a corresponding data area. The direct-memory-write communication can bypass Operating System (OS) and virtualization layers on contemporary processors based on Input/Output Memory Management Unit (I/O-MMU) mapping.

Virtualization means that programs execute on a virtual (rather than native) machine/computer. There are several possible implementations using Virtual Machines (VMs), e.g. VMs executing client OS or Containers.

One way of utilizing virtualization is to have an individual virtualized environment for each application program but it is also possible to execute multiple programs within one virtualized environment. Independently, the I/O-MMU allows for individual mapping and protection of shared areas down to page granularity.

The virtualization support can then include virtualized I/O devices that can be mapped into the application, allowing direct memory writes to bypass client and host OS enabling high bandwidth and low latency.

A common standard for creating virtual I/O devices is Single-Root Input-Output Virtualization (SR-IOV) that allows for a physical PCIexpress device to be shared in virtualized environment by offering multiple virtualized resources that can be made available directly to the application program.

Figure 10:
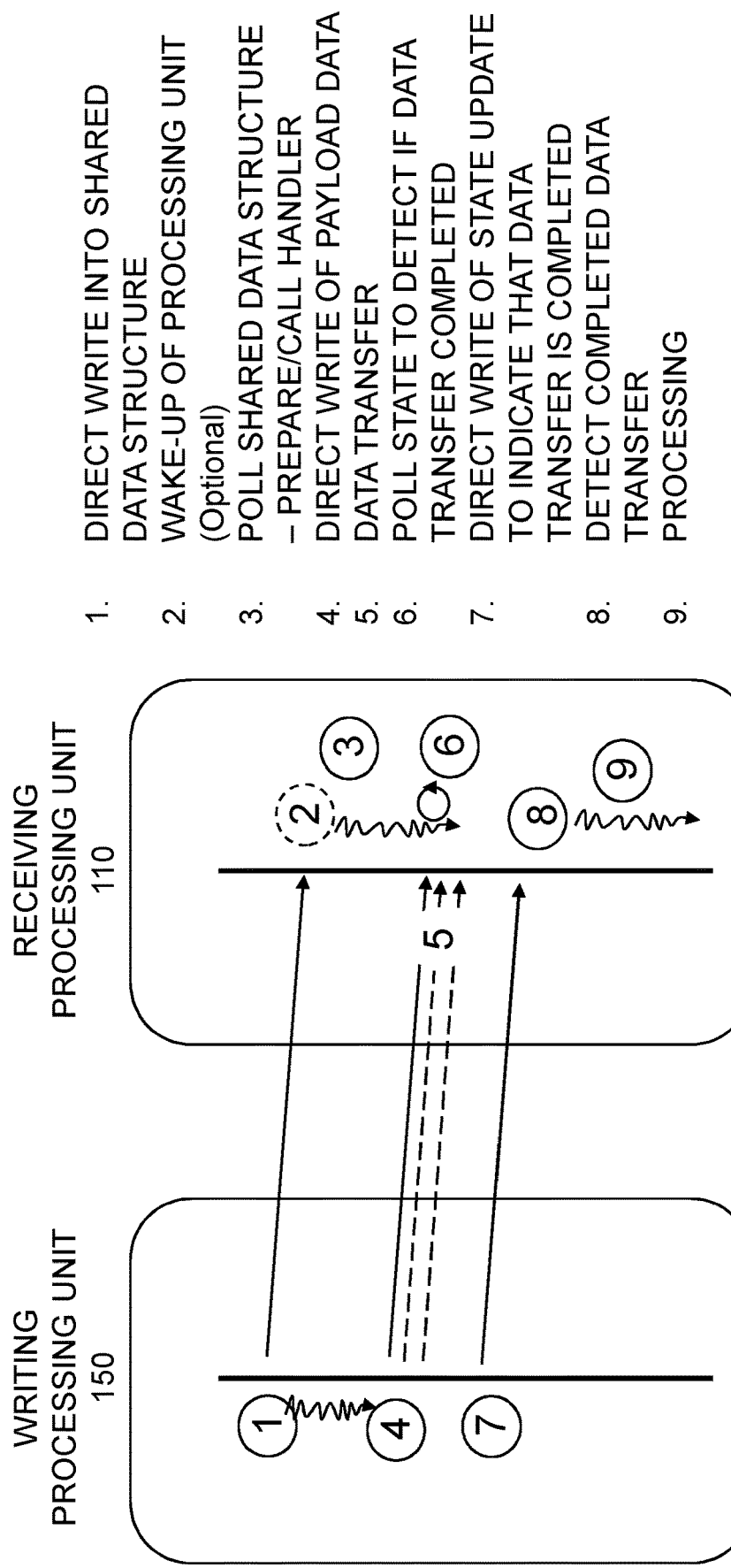
FIG. 10 is a schematic diagram illustrating an example of actions and/or signaling related to two interrelated processing units according to an embodiment.

FIG. 10 is a schematic diagram illustrating an example of actions and/or signaling related to two interrelated processing units according to an embodiment.

Basically, a writing processing unit 150 performs one or more direct memory writes into the memory of a receiving processing unit 110.

In short, the writing processing unit 150 performs a direct memory write operation, setting a bit or a group of bits in the shared data structure as described above to indicate that it will send data and/or a message to the receiving processing unit 110 using a specific application/protocol (i.e. writing into the payload area and state area of the application/protocol). For the receiving processing unit 110, the setting of the bit or the group of bits in the shared data structure directly indicates which writing processing unit 150 that is involved and which application/protocol to execute (e.g. which code to execute and which data structures that will be used).

In a particular example, with reference to FIG. 10, the following flow of actions and/or signaling may take place:
1. The writing processing unit 150 performs a direct write to set a bit or group of bits in the shared data structure, and may then continue preparing payload.
2. The receiving processing unit 110 gets activated, from poll-waiting or wake-up from low power state (optional).
3. The receiving processing unit 110 polls the shared data structure and calls routine for handling indicated application/communication, e.g. prepares by prefetching code and/or data.
4. The writing processing unit 150 performs one or multiple direct writes updating payload data in the memory of receiving processing unit 110.
5. Payload data is transferred. The data may be updated in the memory of the receiving processing unit 110 without any further execution by the receiving processing unit.
6. The receiving processing unit 110 is ready and polls state bits for detecting if data transfer is completed, and continues polling if not.
7. The writing processing unit 150 performs direct write of state update to indicate that data transfer is completed, i.e. that the payload data has been transferred
8. The receiving processing unit 110 actually detects that data transfer is completed, i.e. that the payload has been transferred.
9. The receiving processing unit 110 starts payload validation and processing.

The direct memory write in the shared data structure can thus initiate one or more actions or activities in the receiving processing unit 150, especially activities that otherwise would introduce communication overhead and latency. Examples of such activities may include one or more of the following:

Power management wake up—if the receiving processing unit is in low power mode then the write to the shared data structure may trigger the wakeup.

A scan of the shared data structure to find the event.

An event prioritization—if multiple writing processing units start communication in parallel then multiple bits might be set, and a priority selection may have to be performed to determine which event should be handled first.

A look-up of application/protocol handler code. Each bit maps to a unique application/protocol handler, making it possible for the receiving processing unit to call the right application/protocol handler code.

An application/protocol state prefetch. As each bit may optionally also map to a state field, the receiving processing unit may prefetch the right state field for updates made by the writing processing unit regarding the state of transfer of payload data for the execution of the application in the receiving processing unit.

Polling the state area corresponding to the writing processing unit and application/protocol handler, waiting for indication that a message with payload data has been transferred.

In a sense, the shared data structure used as an activation vector is a concept for starting latency critical operations early, such as power management wake-up, and/or fetching code and/or data. The activation vector enables minimal latency by parallelizing operations while data/message is transferred. One or more of event prioritization, calling the handler and prefetching state may be done in parallel with payload transfer time.

FIG. 11 is a schematic diagram illustrating a specific example of a shared data structure according to an embodiment. In this particular non-limiting example, the shared data structure comprises 256 bits, which may be arranged as 32 bytes of 8 bits each. The proposed technology is based on direct memory writes into the shared data structure used as an activation vector, including bit sets and/or byte writes. Of course, the skilled person understands that other sizes and arrangements of the shared data structure are also possible.

Figure 12:
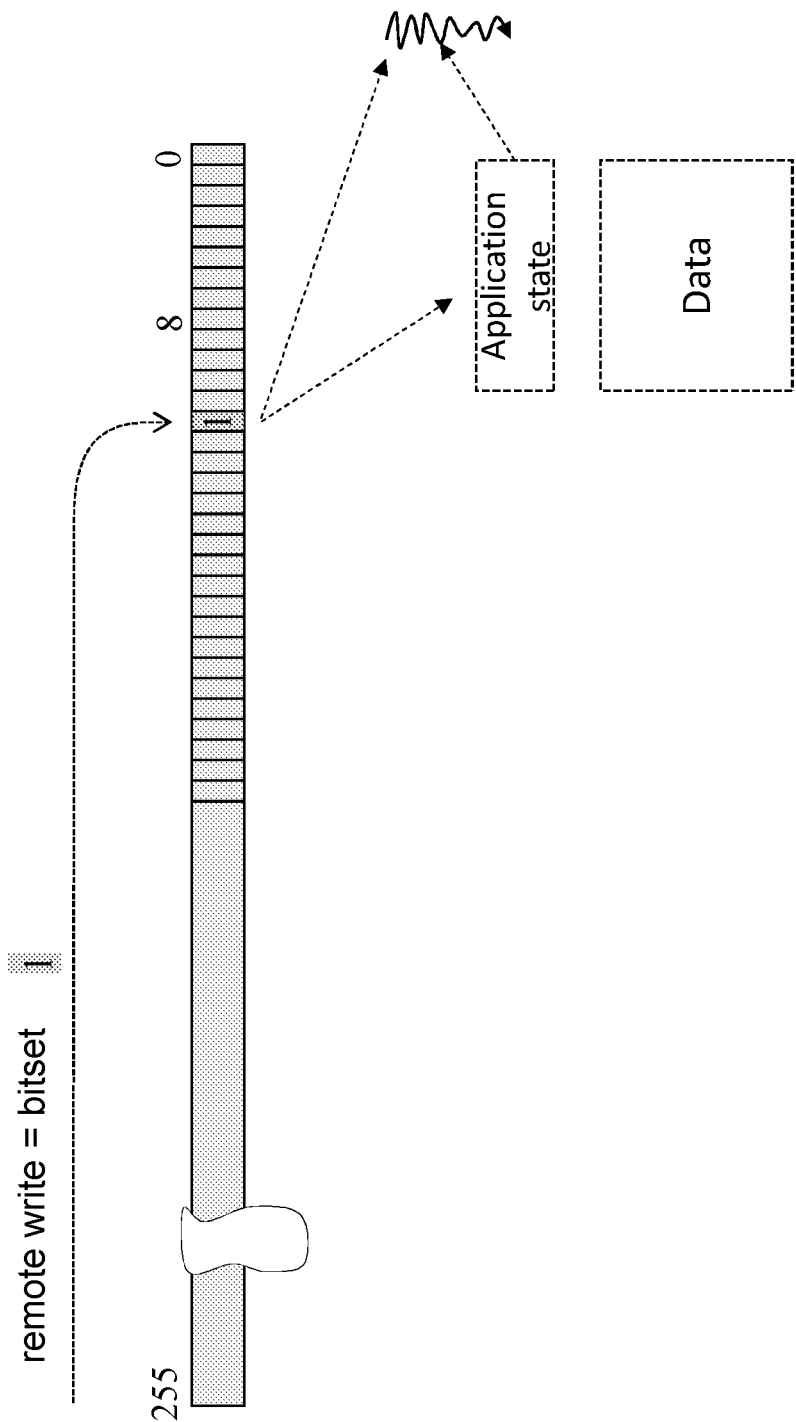
FIG. 12 is a schematic diagram illustrating a specific example of a shared data structure in which a direct bit write setting a bit initiates preparation and/or execution of an application handler according to an embodiment.

FIG. 12 is a schematic diagram illustrating a specific example of a shared data structure in which a direct bit write setting a bit initiates preparation and/or execution of an application handler according to an embodiment. The bit write may thus activate preparation and/or execution of a specific application handler, and may also point to a specific area for polling the application state indicating whether payload data has been transferred.

FIG. 13 is a schematic diagram illustrating another specific example of a shared data structure in which a direct byte write setting one or more bits initiates preparation and/or execution of an application handler according to an embodiment. The bit or bits set by the byte write may activate preparation and/or execution of a specific application handler, and may also point to a specific area for polling the application state indicating whether payload data has been transferred. This may be useful if the network (e.g. PCIe or RDMA) only allows byte writes, not bit writes.

In a particular example, the shared data structure, also referred to as an activation vector, may correspond to a cache line.

Most processors, for example x86 processors, have 32 Byte (256-bit) cache lines. The receiving processing unit defines an activation vector of private bits to set to each writing processing unit for each application or protocol, that is, a standard 32 byte cache line corresponds to up each thread allowing 256 unique writer/protocol communications. For example, up to 32 independent processing units with 8 applications/protocols each, or 16 independent processing units with 16 applications/protocols each.

A 64 byte cache line (512 bits) doubles these numbers. Some newer processor definitions, for example ARMv8 and RISC-V, also allows for 64 Byte cache lines, or 512 unique communications. Also, new x86 processors will upgrade this and support 64 Byte Cache lines.

This should be more than sufficient in many applications and it should not be common that each thread have direct and low latency communication with more than a handful other threads using a handful of protocols.

However, there are also other factors driving the number of bits in the activation vector and there might be a need to extend the range of the activation vector:

Allowing for larger groups when needed.

Encoding other information, for example priority, to specific bits or applications/protocols.

Most interconnect networks do not allow for an atomic remote bit-set operation. The smallest operation is likely a byte write operation.

If more protocol/writer combinations are needed, then an extended activation vector with indirection can be used. In this case, the writer will update first a further indirection can be used and then the indirection.

Newer processor definitions, as ARMv8, allow for longer cache lines and can be designed to work efficiently with processor vector instruction and preferably have a size limited to the vector size of the processor.

FIG. 14 is a schematic diagram illustrating an example of a hierarchical data structure according to an embodiment. As previously described, it may be possible to extend the shared data structure by means of a hierarchical data structure. The shared data structure 130 may be part of an overall hierarchical data structure 136 arranged in at least two levels, wherein the hierarchical data structure 136 comprises multiple shared data structures 130-1, . . . , 130-K and a complementary data structure 135 on a higher level than the multiple shared data structures.

FIG. 15 is a schematic diagram illustrating a particular example of a hierarchical data structure according to an embodiment.

A hierarchical data structure allows for a bit (or byte) in an initial or complementary vector to instead point to a second-level activation vector:

- For these bits there will be two writes instead of one, one for setting a bit (or byte) in the first-level vector and one for the setting of the bit (or byte) in the second-level vector.
- The write to the first-level vector will be the one activating functions that are tied to a single cache line, e.g. triggering power management wake-up
- The bit set in the second or last level will be the bit directly mapping to a code to execute and possibly also a state area to poll for changes.
- The second level does not have to be constrained to a cache line, rather the preferred format may be set by the vector instructions in the processor. Latest generation processors (x86, ARM etc.) now define also 512-bit vector instructions and some (RISC-V) allows a variable length.
- With a 32-byte first level activation vector we can point to 32 second-level vectors, e.g. supporting 32×32=1024 writing processing units even with interconnect that only support byte-wise writes with a two-level hierarchical structure.

The hierarchical data structure separates the functionality that are tied to the cache line length (e.g. power management wakeup and/or interrupt generation) and the functionality that are unique for each combination of writing processing unit (writer) and application/protocol (e.g. directly mapping to code to execute and directly mapping to which application/protocol state to poll).

- A bit (or byte) in the first-level activation vector does not have to be private for each writer. Several threads can set if they are sharing lower level and have their private bit(s) in the last level.
- Writes to the two or more levels can be done with minimal overhead and small extra latency by pipelining, e.g. initiating remote-byte-write, remote-byte-write and a write-synch operation for pushing the writes over the interconnect.
- All levels of the hierarchical data structure may be speculative and hints to the receiver to activate since there is an intention to communicate, e.g. the receiving processing unit (receiver) should wake-up, see which bit or bits are set in the activation vector, call the right code for handling that, potentially prefetch data and start polling the right application/protocol state.

Figure 16:
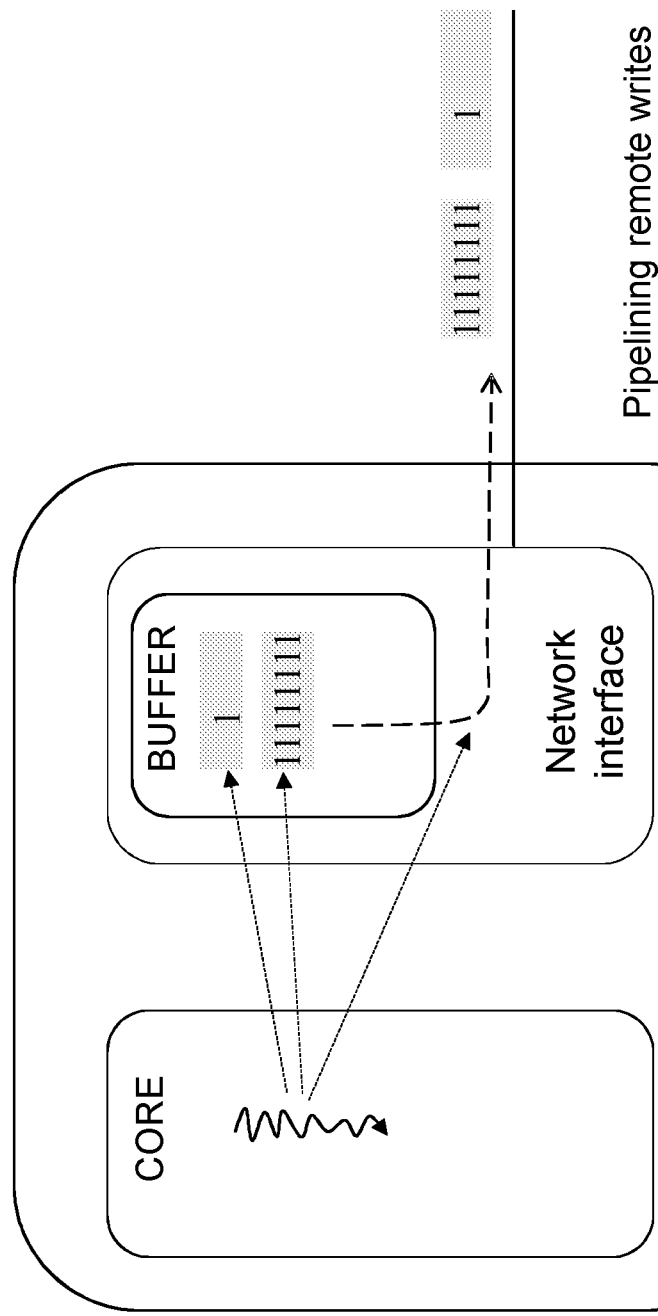
FIG. 16 is a schematic diagram illustrating an example of pipelining of remote writes according to an embodiment.

FIG. 16 is a schematic diagram illustrating an example of pipelining of remote writes according to an embodiment. In general, pipelining two writes has little extra overhead, and interconnect standards keep the ordering of the writes.

For example, the writes of the writing processing unit may first land in a local write buffer:
- "write posting", low overhead and fast,
- e.g. ~1 clock cycle per write or 0.5 ns.

The hardware may speculate on keeping writes in buffer for a short while:
- "write merge" opportunity merge writes if consecutive addresses,
- optimizing bandwidth over latency.

The writing processing unit can (optionally) force writes by write-synch operations:
- overriding the delay for merging writes, optimizing latency over bandwidth,
- SFENCE or MFENCE operation in x86,
- operation has higher overhead, but shared by multiple writes.

In the following, the proposed technology will be described with reference to particular non-limiting examples, wherein the shared data structure is continually referred to as an activation vector.

For a better understanding of the proposed technology, it may be useful to make a brief review and analysis of the state-of-the-art.

The development of low-latency interconnect and low-latency communication mechanisms has been very much driven by the needs for supercomputing, which has properties that differs from event-based system in several ways. In a supercomputing application a processing element or core normally waits for work from a scheduler by polling a single work queue. The assumption is that there is only one queue, e.g. only one writer and one priority during operation. Also, it is assumed that applications are started and then run until they are ready. This leaves few opportunities to save power using power management mechanisms.

Polling gets more complicated for applications when there are multiple input queues. The poll loop must then read and examine each one of the queues looking for the next work. Poll loops typically have a high energy use in a processor.

An event-based system can greatly benefit from a power management solution, for example by going to a sleep state when queues are empty. However, sleep will however add a wake-up latency to the response time. Typically, some hybrid solution is proposed, e.g. keep polling when queues are empty, but if polling queues for some time without getting any new input then going for sleep for shorter periods, and if there is still no work arrived then setting up the interrupt mechanism and going to sleep. However, all these type of hybrid solutions assume a specific statistical behavior and work less well if communication is random and burst oriented—which is the case for communication transferred over the Internet.

In an event-based system there is often a need for handling events with different priorities. One way of supporting this would then be with separate input queues for each priority, i.e. a receiving processing unit would then poll all queues and then select the highest priority arrived event. Having to poll all queues will then add a bit of extra latency also to highest priority activities.

Polling each queue is a serial activity, and after finding the right queue then the input data must be examined for finding out which event it is for dispatching the right function to handle. This gives an inefficient execution with both serialization and pointer-chasing, resulting in higher overhead and additional overhead.

An event-based system should instead be designed with data structures allowing parallelism and provide low overhead for dispatching the event processing.

Communication based on message protocols are predefined and inflexible. Operations and ordering as well as data format are predefined (at least data formats within the header). Operations, like power management has typically not been included in the protocol. Rather, it has been added by including separate power management messages and/or by seeing power management as an indirect operation or side-effect, e.g. arrival of a message triggers a power-up and longer wait timeout between messages triggers a power down.

The reception of a message may start several different activities. In a conventional system, the reception of a message is normally seen as one event; the CPU gets informed at first after a message has arrived fully and been checked (e.g. correct checksum, address and so forth), making it impossible to start activities having a longer delay early.

Conventional standard message-processing hardware waits until a message header has arrived and then performs a "classify" operation to find out which queue to store the message in based on address, port, priority and so forth. Typically, there would then be an interrupt but not until the entire message has arrived and the corresponding checksum has been checked. Waiting for checks adds to latencies and using interrupts adds significantly to both latency and execution overhead.

Communication using direct memory writes allows for dividing the data transfer into separate parts, including splitting the transfer to a write of application/protocol state and one or more writes of payload data. This means that writes can be made in an order that optimizes parallelism, starting longer latency activities early in the receiving entity. The shared data structure, also referred to as an activation vector is such mechanism, enabling activities for quickly handling a message or handling an event notification.

By defining the activation vector as a shared structure, the receiving processing unit gets a single address to poll for new messages. By specifying the activation vector as a vector of individual activation bits, the bit position in the vector can be used for passing important information such as which code to execute, application/protocol priority and so forth.

Making activation explicit, separating it from specific application/protocol state transfer and payload data transfer, makes it possible to explicitly control the order of activities in the receiving processing unit and start activities known to have long delays early.

Further, the shared data structure can preferably be viewed as a hint. The activities in the receiving processing unit may then be performed speculatively. This makes it possible to further reduced latencies.

There may be activities that are needed to be performed very rapidly when reacting to an incoming message or signal.

The proposed design allows for an aggregation where a receiving application waits on a write to a single data structure. At the same time multiple writing processing units can update the shared data structure.

By way of example, the shared data structure allows:

A single address for the receiving processing unit or program to poll.

Activities to start as a reaction of a single write.

The receiving processing unit to determine application/protocol (which application/protocol code to execute and optionally which data areas to read) with minimal overhead, e.g. using vector instructions.

Power management using mechanisms supported in standard processors and instruction sets.

Allows activities to start early, preferably in parallel with transfer of the application/protocol state and payload data itself.

Implementation without conditions between writing processing units and eliminating the overhead for locks on shared data.

The application handler is typically responsible for handling an application in relation to the writing processing unit. In particular, this may be a communication application, e.g. handling a communication service protocol. Examples may include a protocol of a communication service, point-to-point or within a cluster—e.g. a small message transfer service, a bulk data transfer service, a data streaming service and so forth. It can also be other cluster communication services such as broadcast and/or multicast services, notification services, some kind of agreement services (quorum votes, consensus) and so forth.

Also, this so-called activation mechanism itself has very low latency as it leverages the direct memory writes for communication. These bypasses message protocol overhead in that it does not have to be copied into the receiving programs memory area. A write can be directly mapped to the right location by the hardware, e.g. by an Input/Output Memory Management Unit (I/O MMU) without requiring any system call or other execution, e.g. as can be seen from FIG. 8.

Low latency is based on communication using direct memory writes from one processing unit directly into memory of another processing unit, and there is hardware support in modern processors, allowing bypassing system software layers such as Operating System (OS).

By way of example, the shared data structure or activation vector according to the proposed technology may allow for many handlers/protocols and independent processing units (writing processing units). For example, an activation vector defined as a 64 byte vector allows for 64.8=512 different combinations of processing units and application handlers/protocols.

In addition, it is possible for each hardware execution thread and/or core in a multi-threaded processor to have its own activation vector that can be directly addressed by writing processing units. There are no shared resources used by several cores but all resources scale directly proportional to number of cores. In other words, the activation vector mechanism and design scale with the number of cores, which is very different from the processing/communication mechanisms used today.

Also, the activation vector mechanism and design scale down to a single processor. As an example, the activation vector may be defined in software and rely on a few hardware mechanisms. In other words, as mentioned previously, the activation vector works between separate hardware units that can communicate over a standard interconnect, between separate processors on the same unit, between virtual machines executing on the same processor or between executable programs within the same virtual or physical processor or any combination of these.

This means that the mechanism has excellent scalability both up and down. For example, the same software can be used in the full range of system implementation. Also, the software for a large system may, for development purposes, be tested as many virtual machines without changing the software.

Bytewise Allocation

The shared data structure, here referred to as an activation vector, may be updated by multiple writers to the receiving vector. These writers may generally be uncoordinated and can initiate bit set operations at the same time and execute in parallel. This means that the bit set operation should itself be an atomic operation that cannot introduce side-effects on other bits allocated to other writers.

Standard processors provide multiple ways of setting a bit. It can be either direct BitSet instruction or it can be a test-and-set operation, or it can be performed as a logical OR instruction with an immediate value with the corresponding bit set. Some processors have other options such as instruction for manipulating arbitrary bit fields, including bit fields down to a single bit.

However, few interconnect technologies provide a way to do a remote bit set that is atomic, i.e. without a risk of having side effects on other bits. One way to separate bits updated by different writers this is to do bytewise allocation of the activation vector. Each writer gets an 8-bit field providing space for 8 different protocols. A typical 256-bit or 512-bit activation vector in a program can then support up to 32 or 64 independent writers.

All major microprocessor architectures and major operating systems (e.g. Linux) assume bytewise memory addressing. This means that byte-addresses are also assumed on interconnect networks and that interconnects that define remote write operations also allow byte-wide writes. This is for example true for communication over PCIexpress and for RDMA over InfiniBand or Ethernet.

With a byte-wise allocation, then the direct memory write process can keep a copy of what was written last and then locally do a bit set for the new protocol bit and then do a remote write of the byte.

Vector Operations

The activation vector further allows for fast scheduling by the receiving thread. This is achieved by the vector format and using the vector unit within the processor. Typical vector operations allow for wide operations e.g. typically up to 128, 256 or 512-bit vectors.

Vector instructions allow for many of the operations to be performed in a single instruction and potentially in a single clock cycle within the vector unit of state of the art processor.

Masking, selecting which bits in the activation vector to react on by using vector logic operations e.g. vector AND Handling priority—if bits arranged with highest priority first then this can be done using processors bits-scan operation (find-first-one operation or count-leading-zeroes or bit-scan-forward operation depending on processor architecture) to select the highest priority alert.

Mapping Additional Properties

As already described, each bit or specified group of bits within the shared data activation vector map to a unique combination of writer and application/protocol and indicates that there is potentially a message arriving for that application or on that protocol. This direct mapping is essential for achieving high performance.

As also described, a bit in the activation vector further can represent a selected one of a number of priorities etc. but also provide other information or hints that can be useful for the receiving protocol.

To support multiple priorities, a writer can set either a bit in the high priority area of the activation vector or in the normal priority area. The bit-scan operation will then select the right priority. The priorities may be defined on bitwise or bytewise granularity. For example, it is indeed possible to give one high priority byte and one low priority byte and thereby allow for 8 applications/protocols and 32 writers in a standard 64-byte cache line.

That is, the activation vector is not restricted to be a one-to-one mapping to writer and protocol but also encode other hints to the receiving processing unit by using a many-to-one mapping.

Minimal Latency Function Invocation

Event processing includes decoding an incoming event notification, select which code to execute and which data to operate on. This creates a performance problem often referred to as pointer-chasing, i.e. one data must be read first to find out which further data or read or instructions to fetch. Pointer chasing is a performance problem for modern processors as there is a potential long delay in fetching the needed instruction or data, especially if it is not available in the cache.

A bit in the activation vector can be defined to directly map to a protocol and protocol state area. The write to the activation vector provide this information early, before the message itself is transferred. That is, the receiving processing unit can start the longer latency operations in fetching protocol code, prefetching protocol state and start polling the state area in parallel with the message transfer.

Activation Vector as a Hint

As described above, the activation vector can be used to transfer/present early information to the receiving processing unit regarding writer, protocol etc. The Activation Vector should be regarded as a hint, but not as an absolute guarantee that communication will occur as indicated. There can be communication failures and writer program can crash.

This definition is important since it allows for setting bits in the activation vector much earlier before the message is transferred, This makes it possible start long latency operations such as power management wake-up and fetching instructions and local data needed for the protocol processing as early as possible and be concurrent to the writer doing the updates of the data and protocol state areas.

In other words, the content of the activation vector may be regarded as a hint, i.e. it starts activities early, but the selected protocol must poll its corresponding state in memory to get the protocol information. The remote write to the activation vector is done before message is transferred and before updating payload and protocol state for allowing maximum parallelism.

This means that there may need to be two nested poll-loops. The first polls the activation vector itself and then, after determining which protocol and writer, a second poll of the protocol state area for finding when the payload have been updated.

Wake-Up

As mentioned, the activation vector may optionally also serve as a defined (single) cache line for wake-up.

The fastest power management mechanism in current standard processor is wake up from a clock stopped state, often denoted C1. Several modern processor cores also have similar power management states that better handles static power consumption by also supporting a lower "data retention" voltage on processor state and/or full power gating on logic that don't keep state. Also, this power gating can be supported with low wakeup latency, e.g. ~100-300 ns or in the same order as a DRAM access.

One method to trigger wake-up is that the receiving processing unit set up monitor detecting updates a memory address. A remote write to the address from another unit will then trigger a wake-up. For example, ARM processors can use WFE (Wait for Event) instruction that allows a processor core to enter a power management state while hardware monitoring updates to a specific cache line. Also, x86 processors support waiting for an update to specified cache line using MONTOR and MWAIT instructions.

For this reason, an activation vector that has a cache line width can be directly used for this wake-up.

Bitwise or Bytewise Allocation

The activation vector as a bit-vector and correspondingly, setting and clearing bits will be bit-write operation or bit-set/bit-clear operation (or a logical operation with a bit mask). This may be the optimal format as it gives best freedom when assigning bits to different writers.

Not all interconnect solutions support bit-level operations. If so, the activation vector can be assigned to different writers on a byte level leveraging byte write operations. In this case, a writer application gets byte wise allocations for supporting 8 different combinations of protocol, priority and so forth.

Minimal Latency and Low Power with Spin-Wait

Bits in the activation vector may provide direct pointers to which protocol state fields that will be used. That is, a single memory location can be polled using spin-wait for detecting the state change indicating the message reception.

A spin-wait is a very low latency method to detect an incoming message. However, it should not be used for longer time since it also consumes high power. The activation vector allows for starting the polling in parallel with the message transfer, which means that polling time will be very short and we can use polling without risking a high energy use.

During the poll, the address to the state area for the application/protocol will migrate into the L1 data cache and the polling will not allocate interconnect or memory bandwidth. When the remote-write from the writer updates the shared protocol state (indicating that message has been written into memory) then the cache coherency protocol will ensure that this will be updated also in the L1 data cache.

The proposed technology allows for combining an explicit event notification, an explicit application/protocol scheduling hint, a priority mechanism and/or a thread activation that allow for a very low overhead and low latency power management. All these or a subset thereof may be triggered in parallel. It also minimizes latency by allowing the longer latency operations to be started immediately to be executed in parallel with transfer of payload data transfers.

It will be appreciated that the methods and arrangements described herein can be implemented, combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

Figure 17:
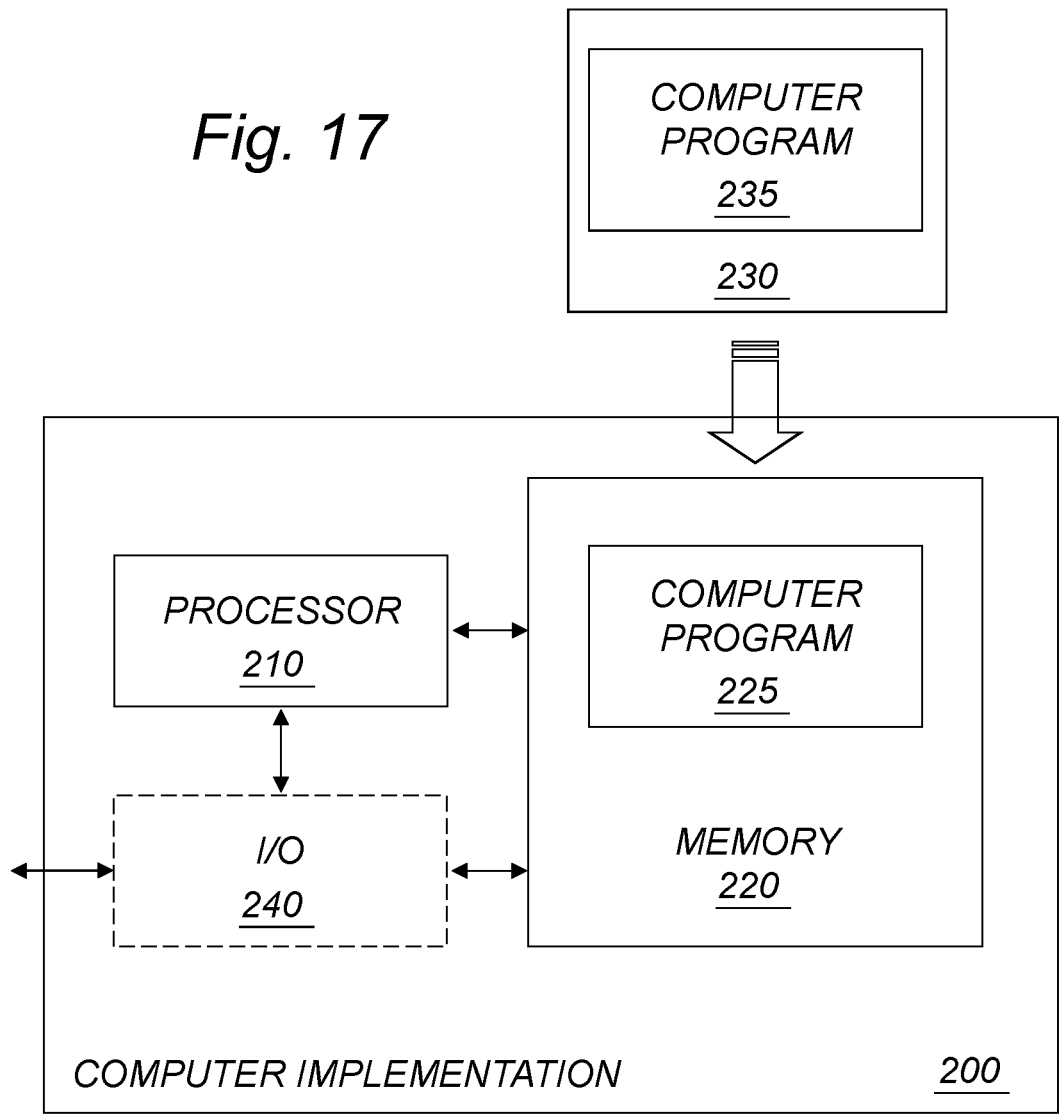
FIG. 17 is a schematic diagram illustrating an example of a computer implementation according to an embodiment.

FIG. 17 is a schematic diagram illustrating an example of a computer implementation 200 according to an embodiment. In this particular example, at least some of the steps, functions, procedures, modules and/or blocks described herein are implemented in a computer program 225; 235, which is loaded into the memory 220 for execution by processing circuitry including one or more processors 210. The processor(s) 210 and memory 220 are interconnected to each other to enable normal software execution. An optional input/output device 240 may also be interconnected to the processor(s) 210 and/or the memory 220 to enable input and/or output of relevant data such as input parameter(s) and/or resulting output parameter(s).

It is also possible to provide a solution based on a combination of hardware and software. The actual hardware-software partitioning can be decided by a system designer based on a number of factors including processing speed, cost of implementation and other requirements.

The term 'processor' should be interpreted in a general sense as any system or device capable of executing program code or computer program instructions to perform a particular processing, determining or computing task.

The processing circuitry including one or more processors 210 is thus configured to perform, when executing the computer program 225, well-defined processing tasks such as those described herein.

In a particular aspect, there is provided a computer program for operating, when executed, a processing system comprising at least one internal processing unit and associated memory. The computer program comprises instructions, which when executed by at least one processor, cause the at least one processor to:

enable at least one area of the memory of the at least one internal processing unit to be accessible by at least two other independent processing units, wherein the at least one area of the memory comprises a data structure shared by the at least two other independent processing units that are allowed to perform direct memory writes into the shared data structure;

allocate, to each one of the at least two other independent processing units, a dedicated set of one or more bits in the shared data structure, wherein each bit or each group of bits in the shared data structure represents a unique combination of i) independent processing unit and ii) application handler for handling an application in relation to the corresponding independent processing unit; and initiate, in response to a direct memory write setting a bit or a group of bits in the shared data structure, preparation and/or activation of the application handler represented by the set bit or the set group of bits.

The processing circuitry does not have to be dedicated to only execute the above-described steps, functions, procedure and/or blocks, but may also execute other tasks.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, the software or computer program 225; 235 may be realized as a computer program product, which is normally carried or stored on a computer-readable medium 220; 230, in particular a non-volatile or non-transitory medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Figure 18:
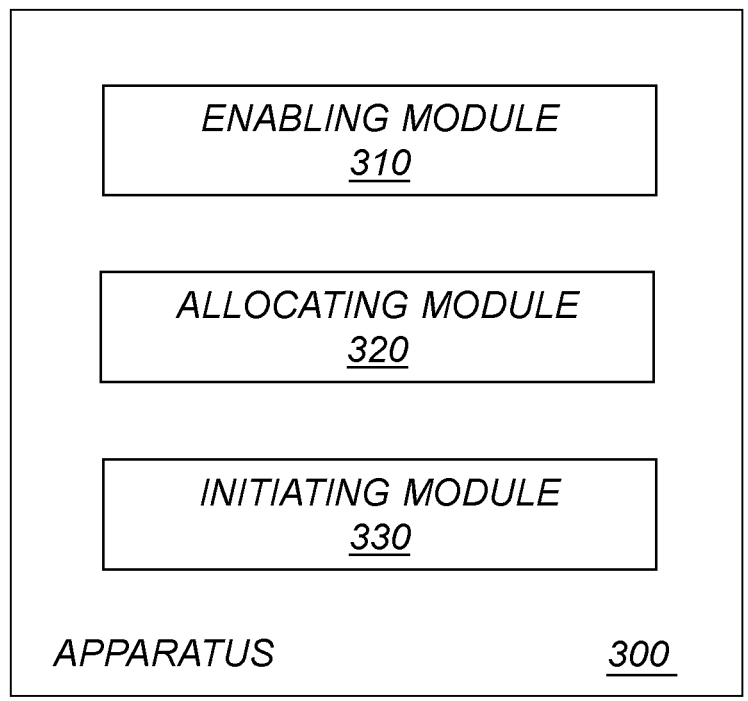
FIG. 18 is a schematic diagram illustrating an example of an apparatus for operating a processing system according to an embodiment.

FIG. 18 is a schematic diagram illustrating an example of an apparatus for operating a processing system comprising at least one internal processing unit and associated memory. Basically the apparatus 300 comprises:

an enabling module 310 for enabling at least one area of the memory of the at least one internal processing unit to be accessible by at least two other independent processing units, wherein the at least one area of the memory comprises a data structure shared by the at least two other independent processing units that are allowed to perform direct memory writes into the shared data structure;

an allocating module 320 for allocating, to each one of the at least two other independent processing units, a dedicated set of one or more bits in the shared data structure, wherein each bit or each group of bits in the shared data structure represents a unique combination of i) independent processing unit and ii) application handler for handling an application in relation to the corresponding independent processing unit; and an initiating module 330 for initiating, in response to a direct memory write setting a bit or a group of bits in the shared data structure, preparation and/or activation of the application handler represented by the set bit or the set group of bits.

Alternatively it is possible to realize the module(s) in FIG. 18 predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending signals. The extent of software versus hardware is purely implementation selection.

Figure 19:
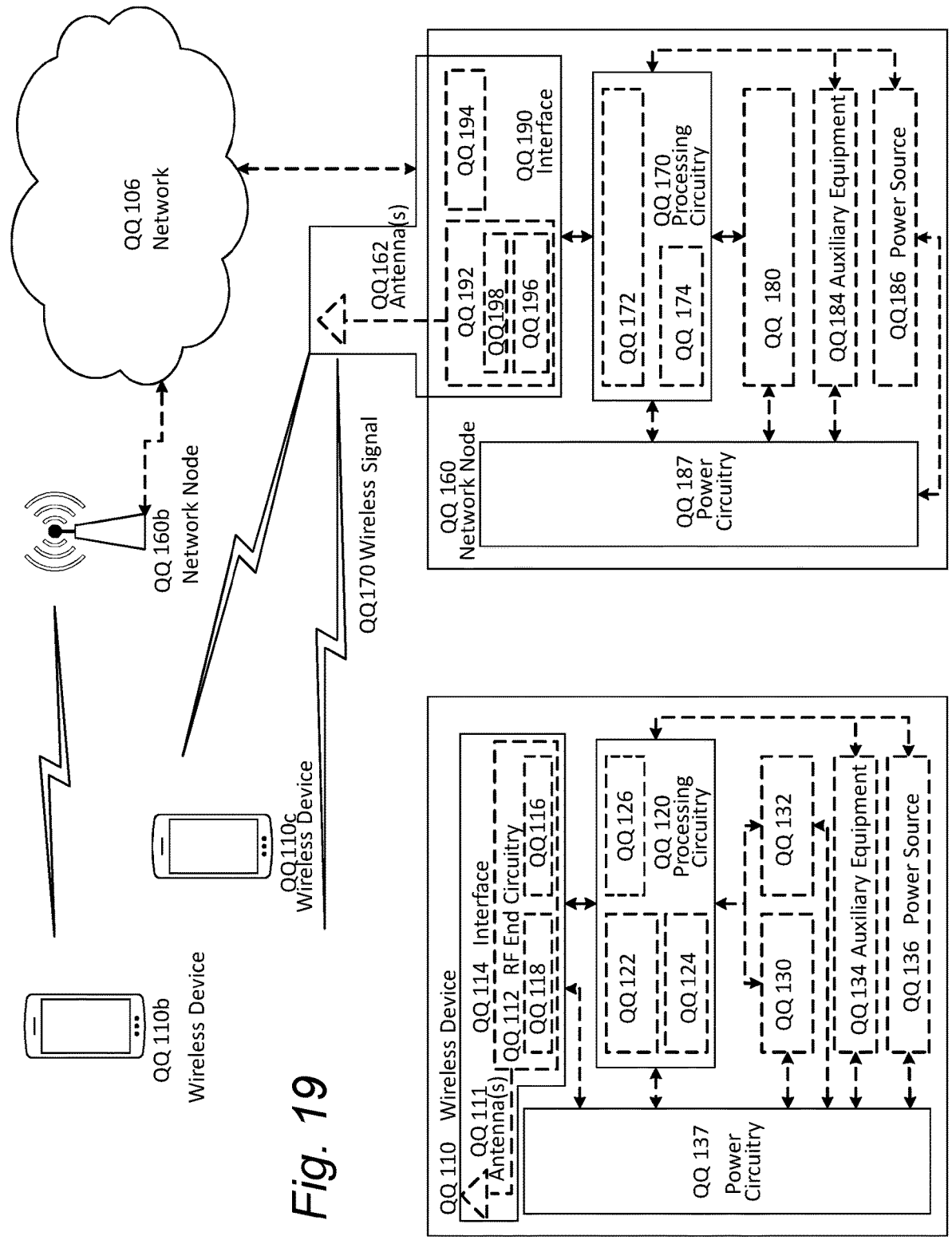
FIG. 19 is a schematic diagram illustrating an example of a wireless network in accordance with some embodiments.

By way of example, the "virtual" apparatus may be implemented in a wireless device or network node (e.g., wireless device QQ110 or network node QQ160 shown in FIG. 19). The apparatus is operable to carry out the example method(s) described herein, e.g. with reference to any of FIGS. 2-5 and possibly any other processes or methods disclosed herein. It is also to be understood that the method (s) of any of FIGS. 2-5 is not necessarily carried out solely by the apparatus in FIG. 18. At least some operations of the method can be performed by one or more other entities.

For example, the virtual apparatus may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments.

The term module or unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

It is becoming increasingly popular to provide computing services (hardware and/or software) in network devices such as network nodes and/or servers where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e. in the so-called cloud. This is sometimes also referred to as cloud computing, which is a model for enabling ubiquitous on-demand network access to a pool of configurable computing resources such as networks, servers, storage, applications and general or customized services. There are different forms of virtualization that can be useful in this context, including one or more of:

Consolidation of network functionality into virtualized software running on customized or generic hardware. This is sometimes referred to as network function virtualization.

Co-location of one or more application stacks, including operating system, running on separate hardware onto a single hardware platform. This is sometimes referred to as system virtualization, or platform virtualization.

Co-location of hardware and/or software resources with the objective of using some advanced domain level scheduling and coordination technique to gain increased system resource utilization. This is sometimes referred to as resource virtualization, or centralized and coordinated resource pooling.

Although it may often desirable to centralize functionality in so-called generic data centers, in other scenarios it may in fact be beneficial to distribute functionality over different parts of the network.

A Network Device (ND) may generally be seen as an electronic device being communicatively connected to other electronic devices in the network.

By way of example, the network device may be implemented in hardware, software or a combination thereof. For example, the network device may be a special-purpose network device or a general purpose network device, or a hybrid thereof.

A special-purpose network device may use custom processing circuits and a proprietary operating system (OS), for execution of software to provide one or more of the features or functions disclosed herein.

A general purpose network device may use common off-the-shelf (COTS) processors and a standard OS, for execution of software configured to provide one or more of the features or functions disclosed herein.

By way of example, a special-purpose network device may include hardware comprising processing or computing resource(s), which typically include a set of one or more processors, and physical network interfaces (NIs), which sometimes are called physical ports, as well as non-transitory machine readable storage media having stored thereon software. A physical NI may be seen as hardware in a network device through which a network connection is made, e.g. wirelessly through a wireless network interface controller (WNIC) or through plugging in a cable to a physical port connected to a network interface controller (NIC). During operation, the software may be executed by the hardware to instantiate a set of one or more software instance(s). Each of the software instance(s), and that part of the hardware that executes that software instance, may form a separate virtual network element.

By way of another example, a general purpose network device may for example include hardware comprising a set of one or more processor(s), often COTS processors, and network interface controller(s) (NICs), as well as non-transitory machine readable storage media having stored thereon software. During operation, the processor(s) executes the software to instantiate one or more sets of one or more applications. While one embodiment does not implement virtualization, alternative embodiments may use different forms of virtualization—for example represented by a virtualization layer and software containers. For example, one such alternative embodiment implements operating system-level virtualization, in which case the virtualization layer represents the kernel of an operating system (or a shim executing on a base operating system) that allows for the creation of multiple software containers that may each be used to execute one of a sets of applications. In an example embodiment, each of the software containers (also called virtualization engines, virtual private servers, or jails) is a user space instance (typically a virtual memory space). These user space instances may be separate from each other and separate from the kernel space in which the operating system is executed; the set of applications running in a given user space, unless explicitly allowed, cannot access the memory of the other processes. Another such alternative embodiment implements full virtualization, in which case: 1) the virtualization layer represents a hypervisor (sometimes referred to as a Virtual Machine Monitor (VMM)) or the hypervisor is executed on top of a host operating system; and 2) the software containers each represent a tightly isolated form of software container called a virtual machine that is executed by the hypervisor and may include a guest operating system.

A hypervisor is the software/hardware that is responsible for creating and managing the various virtualized instances and in some cases the actual physical hardware. The hypervisor manages the underlying resources and presents them as virtualized instances. What the hypervisor virtualizes to appear as a single processor may actually comprise multiple separate processors. From the perspective of the operating system, the virtualized instances appear to be actual hardware components.

A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications as well as the virtualization layer and software containers if implemented, are collectively referred to as software instance(s). Each set of applications, corresponding software container if implemented, and that part of the hardware that executes them (be it hardware dedicated to that execution and/or time slices of hardware temporally shared by software containers), forms a separate virtual network element(s).

The virtual network element(s) may perform similar functionality compared to Virtual Network Element(s) (VNEs). This virtualization of the hardware is sometimes referred to as Network Function Virtualization (NFV)). Thus, NFV may be used to consolidate many network equipment types onto industry standard high volume server hardware, physical switches, and physical storage, which could be located in data centers, NDs, and Customer Premise Equipment (CPE). However, different embodiments may implement one or more of the software container(s) differently. For example, while embodiments are illustrated with each software container corresponding to a VNE, alternative embodiments may implement this correspondence or mapping between software container-VNE at a finer granularity level; it should be understood that the techniques described herein with reference to a correspondence of software containers to VNEs also apply to embodiments where such a finer level of granularity is used.

According to yet another embodiment, there is provided a hybrid network device, which includes both custom processing circuitry/proprietary OS and COTS processors/standard OS in a network device, e.g. in a card or circuit board within a network device ND. In certain embodiments of such a hybrid network device, a platform Virtual Machine (VM), such as a VM that implements functionality of a special-purpose network device, could provide for para-virtualization to the hardware present in the hybrid network device.

The proposed technology is generally applicable to computers and processing technology, and technological digital processing systems, and technical applications of such processing systems.

As indicated, the shared data structure may also be applicable within cloud application frameworks. Current frameworks use TCP or UDP on IP based protocols. However, some cloud providers have now started to use RDMA internally within their clouds, often referred to as east-west communication. East-west traffic, in a networking context, is the transfer of data packets from server to server within a data center. The term east-west for this type of traffic comes from network diagram drawings that usually depict local area network (LAN) traffic horizontally. In contrast, north-south traffic describes client-to-server traffic that moves between the data center and a location outside of the data center network. North-south traffic is typically depicted vertically to illustrate traffic that flows above or below the data center.

RDMA implementations as RoCE (Remote DMA over Converged Ethernet) and iWARP provides a mechanism for remote write which is the base operation for updating the activation vector. Other mechanisms discussed are or will be available in standard cloud processors, for example HW support form monitoring events (e.g. writes) to a specific cache-line address and initiating power management wake-up when the line is accessed. That is, the invention can be used as described also within cloud without modification.

Today, the focus in cloud is efficiency and throughput. The overheads in traditional networking protocols are no longer tolerable for replication of data between servers and storage and the shift to RDMA communication has already started. For example, entire data centers (e.g. hundreds of thousands of computers) are using RDMA (remote direct memory access) for internal, east-west communication.

The invention will be increasingly interesting over time when RDMA gets more generally used within databases storage system. More latency critical applications are moved to cloud when cloud characteristics improve with new generations of processors. This will further increase the demands on low and predictable communication latency.

Emerging cloud databases and cloud frameworks are also shifting to use RDMA and can benefit from the invention.

In particular, the proposed technology may be applied to specific applications and communication scenarios including providing various services within wired and/or wireless networks, including so-called Over-the-Top (OTT) services. For example, the proposed technology enables and/or includes transfer and/or transmission and/or reception of relevant user data and/or control data in wired and/or wireless communications.

In the following, a set of illustrative non-limiting examples will now be described with reference to FIGS. 18-24.

FIG. 19 is a schematic diagram illustrating an example of a wireless network in accordance with some embodiments.

Although the subject matter described herein may be implemented in any appropriate type of system using any suitable components, the embodiments disclosed herein are described in relation to a wireless network, such as the example wireless network illustrated in FIG. 19. For simplicity, the wireless network of FIG. 19 only depicts network QQ106, network nodes QQ160 and QQ160b, and WDs QQ110, QQ110b, and QQ110c. In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or Zig Bee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 19, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 19 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used. Alternative embodiments of network node QQ160 may include additional components beyond those shown in FIG. 19 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal. As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/ or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 20:
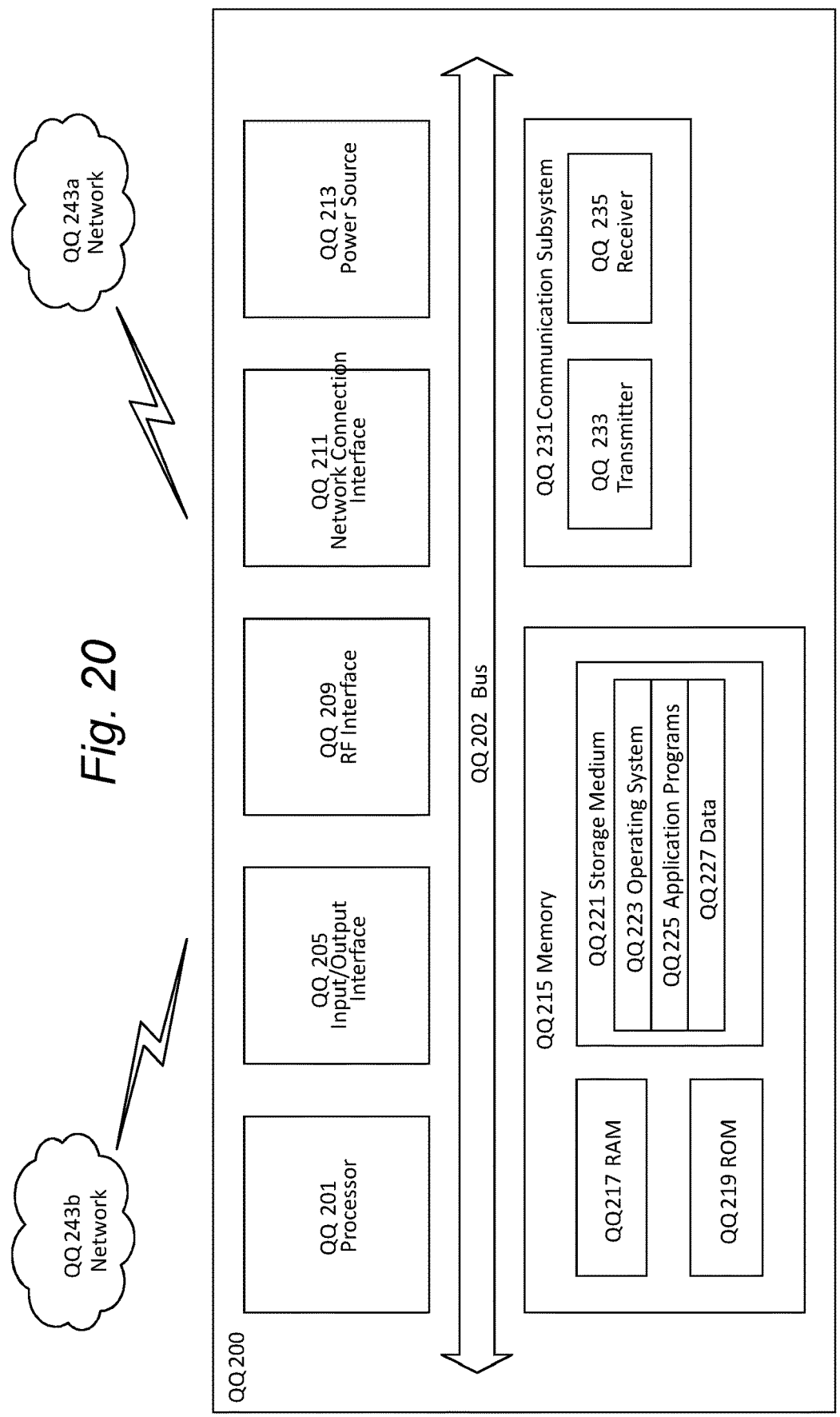
FIG. 20 is a schematic diagram illustrating an example of an embodiment of a UE in accordance with various aspects described herein.

FIG. 20 is a schematic diagram illustrating an example of an embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the $3^{rd}$ Generation Partnership Project (3GPP), including a NB-IoT UE, a machine type communication (MTC) UE, and/or an enhanced MTC (eMTC) UE. UE QQ200, as illustrated in FIG. 20, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 20 is a UE, the components discussed herein are equally applicable to a WD, and vice-versa.

In FIG. 20, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 20, or only a subset of the components. The level of integration between the components may vary from one UE to another UE. Further, certain UEs may contain multiple instances of a component, such as multiple processors, memories, transceivers, transmitters, receivers, etc.

In FIG. 20, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 20, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 20, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 21:
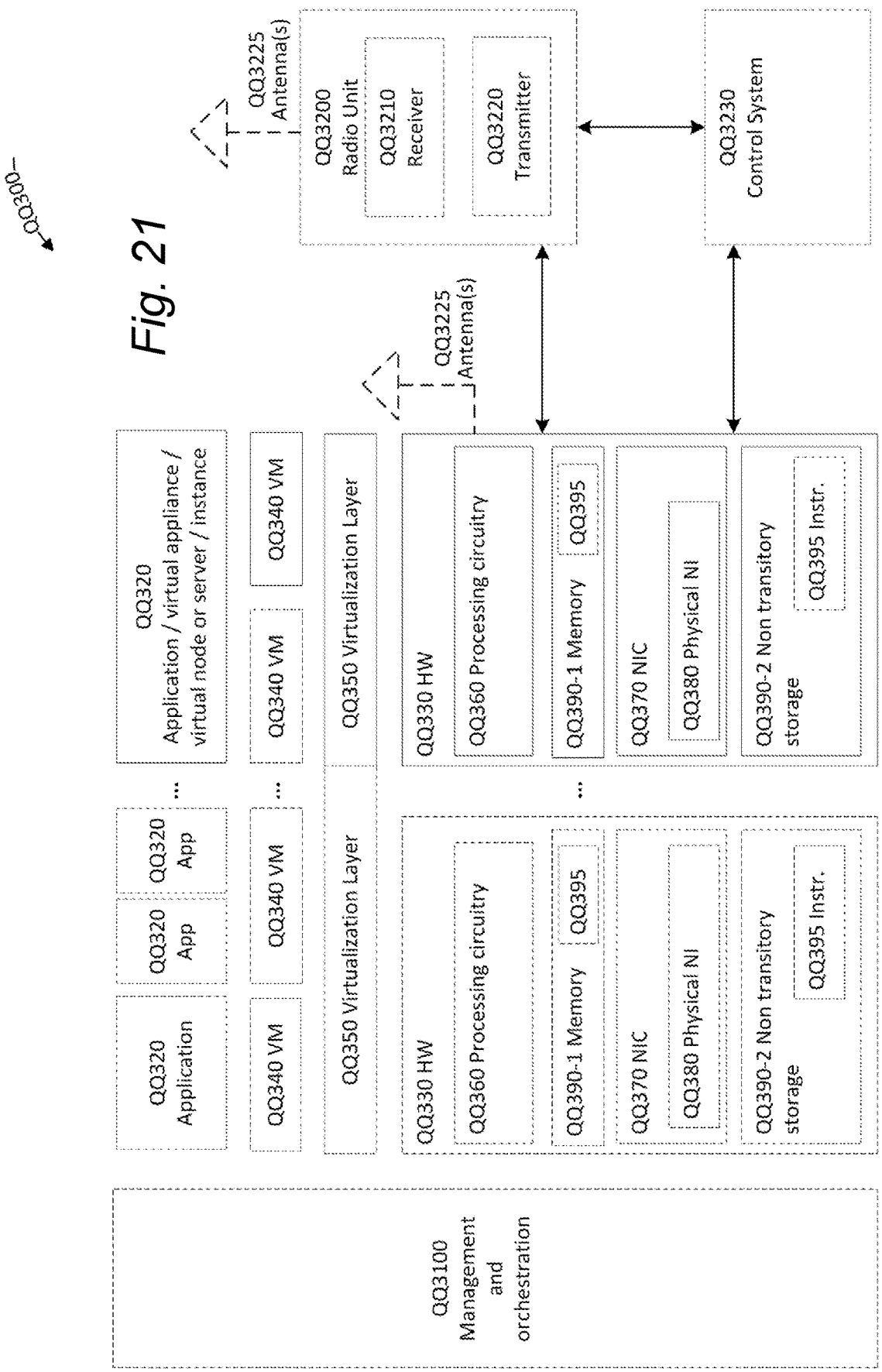
FIG. 21 is a schematic block diagram illustrating an example of a virtualization environment in which functions implemented by some embodiments may be virtualized.

FIG. 21 is a schematic block diagram illustrating an example of a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 21, hardware QQ330 may be a stand-alone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 21.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 22:
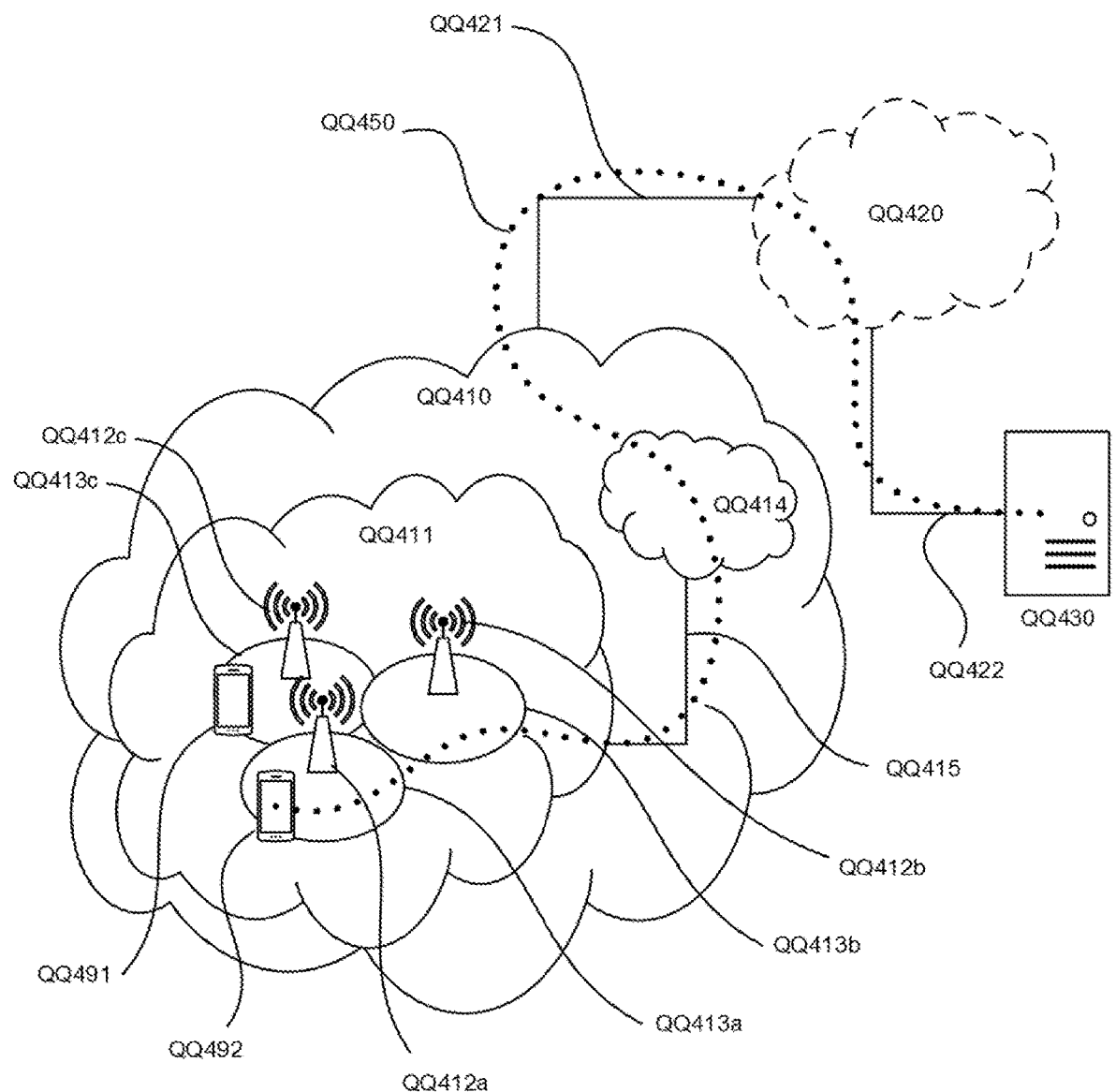
FIG. 22 is a schematic diagram illustrating an example of a telecommunication network connected via an intermediate network to a host computer in accordance with some embodiments.

FIG. 22 is a schematic diagram illustrating an example of a telecommunication network connected via an intermediate network to a host computer in accordance with some embodiments.

With reference to FIG. 22, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 22 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 23:
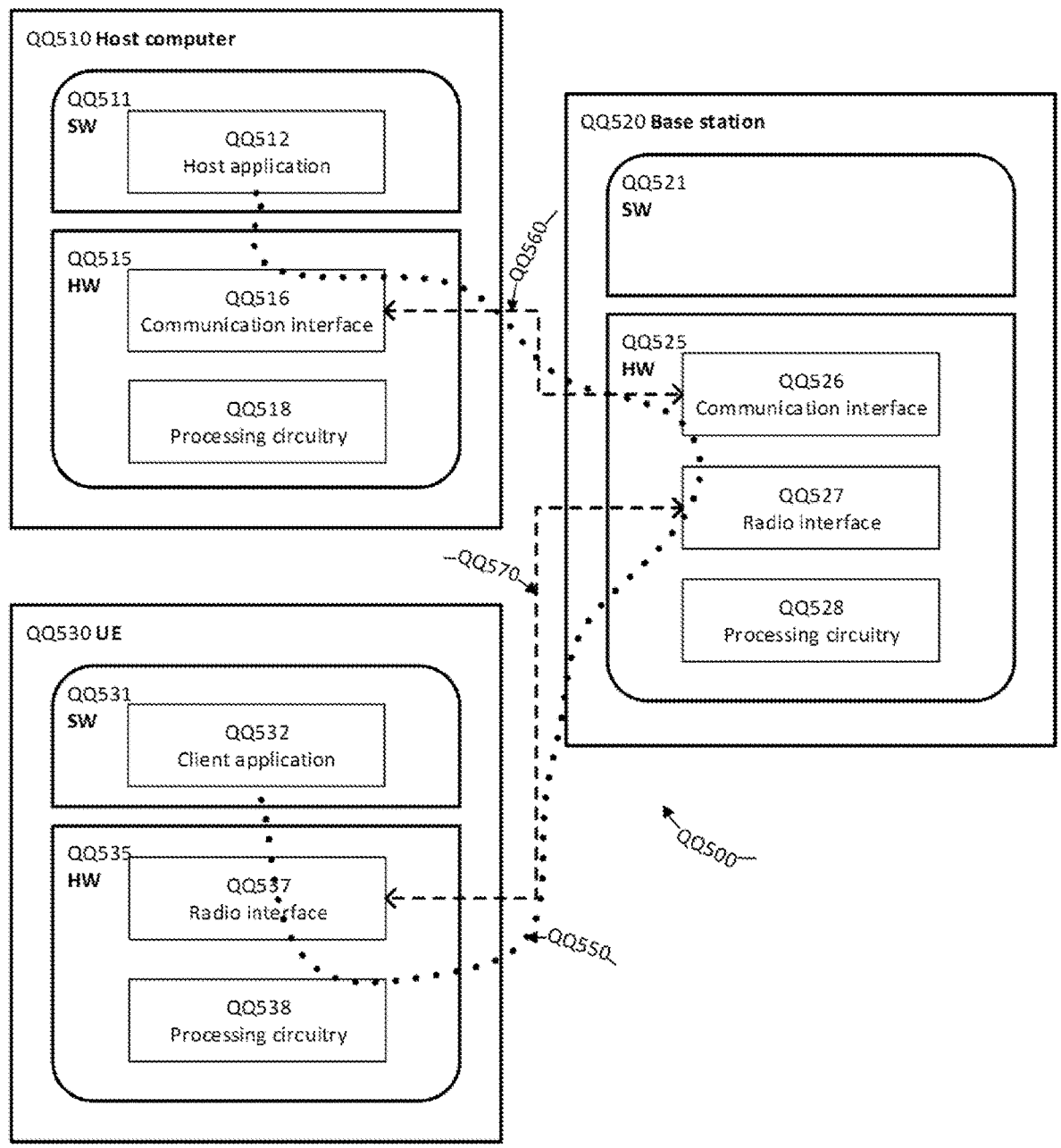
FIG. 23 is a schematic diagram illustrating an example of a host computer communicating via a base station with a user equipment over a partially wireless connection in accordance with some embodiments.

FIG. 23 is a schematic diagram illustrating an example of a host computer communicating via a base station with a user equipment over a partially wireless connection in accordance with some embodiments Example implementations, in accordance with an embodiment, of the UE, base station and host computer discussed in the preceding paragraphs will now be described with reference to FIG. 23. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 23) served by base station QQ520. Communication interface QQ526 may be configured to facilitate connection QQ560 to host computer QQ510. Connection QQ560 may be direct or it may pass through a core network (not shown in FIG. 23) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. The hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 23 may be similar or identical to host computer QQ430, one of base stations QQ412a, QQ412b, QQ412c and one of UEs QQ491, QQ492 of FIG. 22, respectively. This is to say, the inner workings of these entities may be as shown in FIG. 23 and independently, the surrounding network topology may be that of FIG. 22.

In FIG. 23, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 24A:
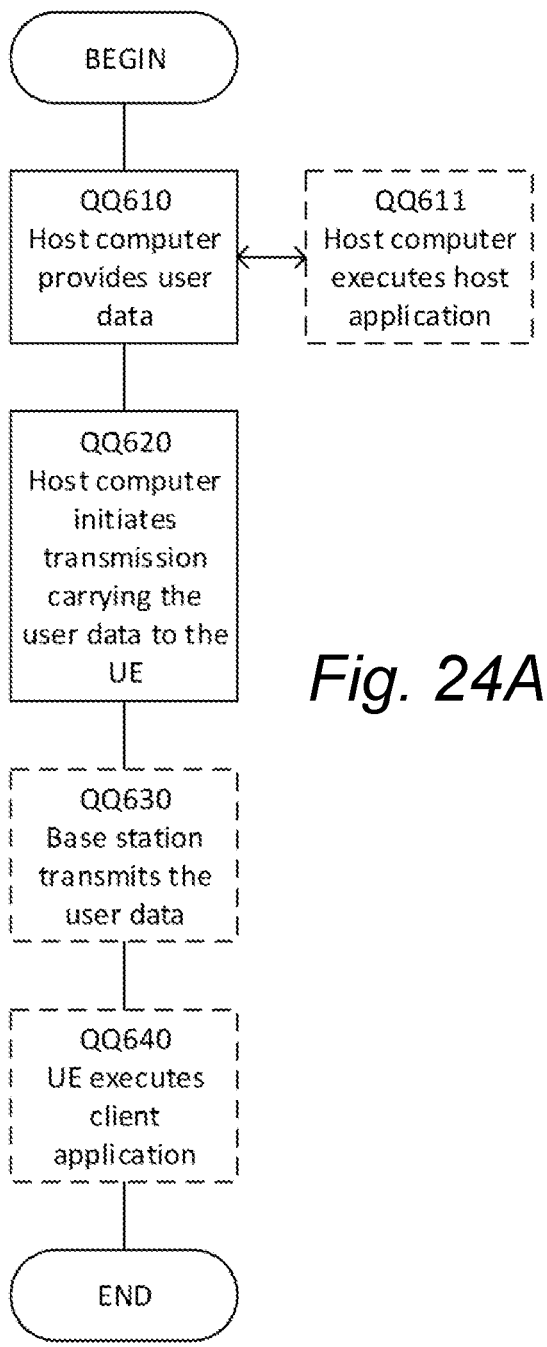
FIGS. 24A-B are schematic flow diagrams illustrating examples of methods implemented in a communication system including, e.g. a host computer, and optionally also a base station and a user equipment in accordance with some embodiments.
Figure 24B:
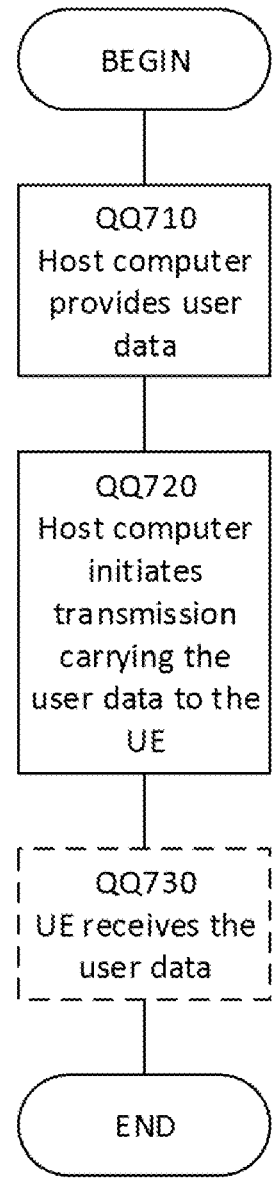

FIGS. 24A-B are schematic flow diagrams illustrating examples of methods implemented in a communication system including, e.g. a host computer, and optionally also a base station and a user equipment in accordance with some embodiments.

FIG. 24A is a flowchart illustrating a method implemented in a communication system, in accordance with one embodiment. The communication system includes a host computer, a base station and a UE which may be those described with reference to FIG. 22 and FIG. 23. For simplicity of the present disclosure, only drawing references to FIG. 24A will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

FIG. 24B is a flowchart illustrating a method implemented in a communication system, in accordance with one embodiment. The communication system includes a host computer, a base station and a UE which may be those described with reference to FIG. 22 and FIG. 23. For simplicity of the present disclosure, only drawing references to FIG. 24B will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figures 25A, 25B:
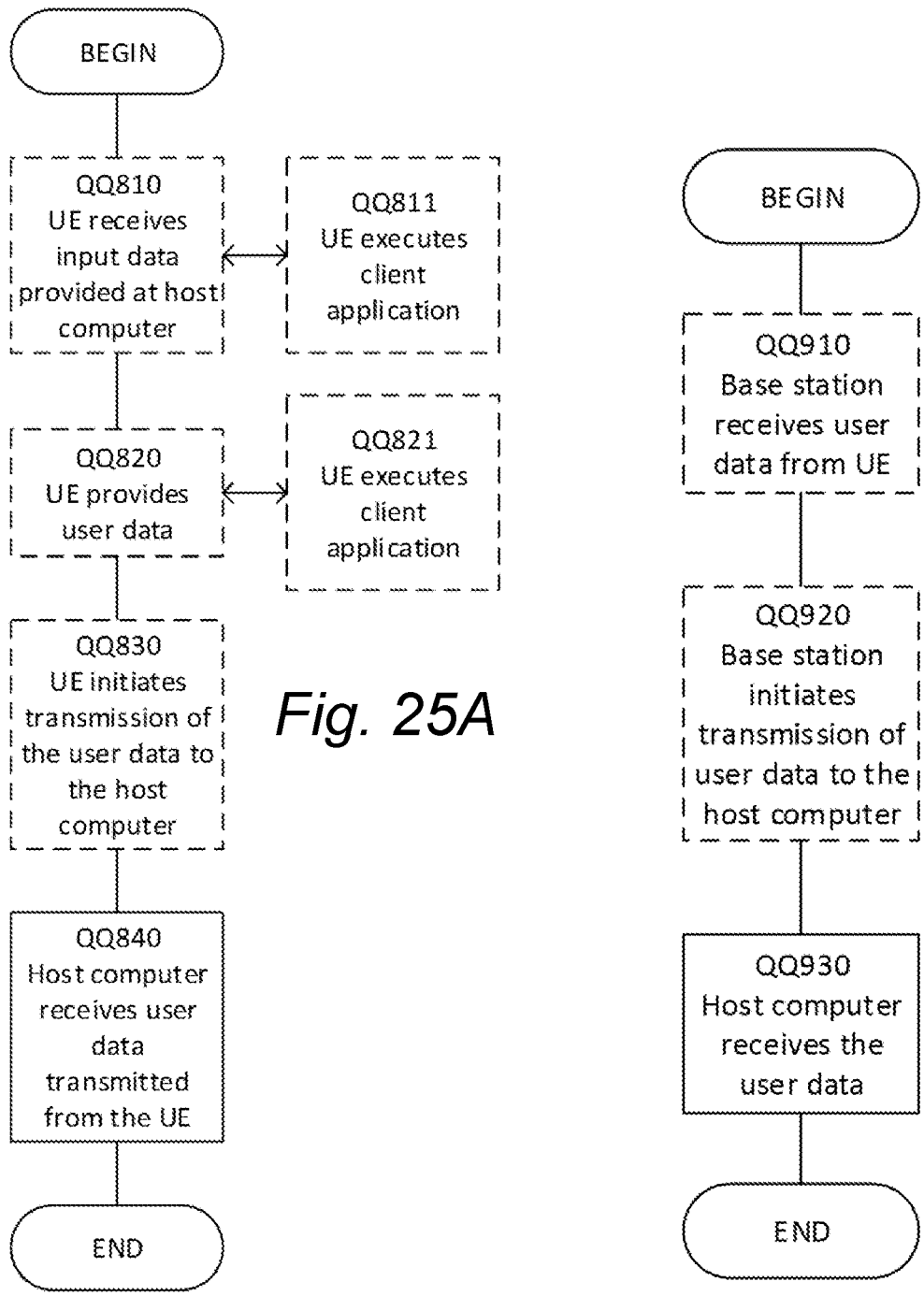
FIGS. 25A-B are schematic diagrams illustrating examples of methods implemented in a communication system including a host computer, a base station and a user equipment in accordance with some embodiments.

FIGS. 25A-B are schematic diagrams illustrating examples of methods implemented in a communication system including a host computer, a base station and a user equipment in accordance with some embodiments.

FIG. 25A is a flowchart illustrating a method implemented in a communication system, in accordance with one embodiment. The communication system includes a host computer, a base station and a UE which may be those described with reference to FIG. 22 and FIG. 23. For simplicity of the present disclosure, only drawing references to FIG. 25A will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

FIG. 25B is a flowchart illustrating a method implemented in a communication system, in accordance with one embodiment. The communication system includes a host computer, a base station and a UE which may be those described with reference to FIG. 22 and FIG. 23. For simplicity of the present disclosure, only drawing references to FIG. 25B will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

In the following, examples of illustrative and non-limiting embodiments will be given:

There is provided a method performed by a network node such as a base station as described herein.

Optionally, the method further comprises:
obtaining user data; and
forwarding the user data to a host computer or a wireless device.

There is also provided a network node such as a base station comprising processing circuitry configured to perform any of the steps of the method described herein.

There is further provided a communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps of the method described herein.

In a particular example embodiment, the communication system further includes the base station.

In yet another example embodiment, the processing circuitry of the host computer is configured to execute a host application, thereby providing the user data; and the UE comprises processing circuitry configured to execute a client application associated with the host application.

There is also provided a method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps of the method described herein.

In a particular example embodiment, the method further comprises, at the base station, transmitting the user data.

In yet another example embodiment, the user data is provided at the host computer by executing a host application, and the method further comprises, at the UE, executing a client application associated with the host application.

There is further provided a communication system including a host computer comprising a communication interface configured to receive user data originating from a transmission from a user equipment (UE) to a base station, wherein the base station comprises a radio interface and processing circuitry, the base station's processing circuitry configured to perform any of the steps of the method described herein.

In a particular example, the communication system includes the base station.

In yet another example embodiment, the communication system further includes the UE, wherein the UE is configured to communicate with the base station.

By way of example, the processing circuitry of the host computer may be configured to execute a host application; and the UE may be configured to execute a client application associated with the host application, thereby providing the user data to be received by the host computer.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

Abbreviations

At least some of the following abbreviations may be used in this disclosure. If there is an inconsistency between abbreviations, preference should be given to how it is used above. If listed multiple times below, the first listing should be preferred over any subsequent listing(s).
1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A processing system comprising at least one internal processing unit and associated memory, at least one area of the memory being accessible by at least two other independent processing units,
  the at least one area of the memory of the at least one internal processing unit comprising a data structure shared by the at least two other independent processing units that are allowed to perform direct memory writes into the shared data structure;
  the processing system being configured to allocate a dedicated set of one or more bits in the shared data structure to each one of the at least two other independent processing units, each bit or each group of bits in the shared data structure indicating a unique combination of i) independent processing unit and ii) application handler for handling an application in relation to the corresponding independent processing unit;
  the processing system being configured to initiate, in response to a direct memory write setting a bit or a group of bits in the shared data structure, at least one of preparation and activation of the application handler indicated by the set bit or the set group of bits;
  the memory of the at least one internal processing unit further comprises, for each combination of independent processing unit and application handler, an application state area and a corresponding data area; and
  each bit or each group of bits further represents an application state area in the memory for storing information about the state of transfer of data from the corresponding independent processing unit to be used in execution of the application handler, completion of transfer of data being detected by polling the indicated application state area.

2. The processing system of claim 1, wherein the at least one internal processing unit is at least one of a physical and logical processing the and the at least two independent processing units are at least one of physical and logical processing units.

3. The processing system of claim 1, wherein the at least two independent processing units are remote processing units allowed to perform direct memory writes into the shared data structure.

4. The processing system of claim 1, wherein at least one of:
  the at least one internal processing unit is one of a virtual machine and a container executing on at least one processor, and
  the at least two independent processing units are at least one of virtual machines and containers executing on at least one processor.

5. The processing system of claim 1, wherein the at least two independent processing units are independently startable and manageable processing units.

6. The processing system of claim 1, wherein each application handler is defined by application handler code accessible from memory for execution by the at least one internal processing unit.

7. The processing system of claim 1, wherein the at least one internal processing unit is configured to poll the shared data structure in response to a direct memory write setting a bit or a group of bits in the shared data structure to determine which application handler to at least one of prepare and activate.

8. The processing system of claim 1, wherein the processing system comprises at least two shared data structures for at least one of application handler preparation and activation, one shared data structure for each of at least of a number J of execution cores and threads corresponding to processing units in the processing system.

9. A method of operating a processing system comprising at least one internal processing unit and associated memory, the method comprising:
  enabling at least one area of the memory of the at least one internal processing unit to be accessible by at least two other independent processing units, the at least one area of the memory comprising a data structure shared by the at least two other independent processing units that are allowed to perform direct memory writes into the shared data structure;
  allocating, to each one of the at least two other independent processing units, a dedicated set of one or more bits in the shared data structure, each bit or each group of bits in the shared data structure representing a unique combination of i) independent processing unit and ii) application handler for handling an application in relation to the corresponding independent processing unit; and
  initiating, in response to a direct memory write setting a bit or a group of bits in the shared data structure, at least one of preparation and activation of the application handler represented by the set bit or the set group of bits;
  the memory of the at least one internal processing unit further comprises, for each combination of independent processing unit and application handler, an application state area and a corresponding data area; and
  each bit or each group of bits further represents an application state area in the memory for storing information about the state of transfer of data from the corresponding independent processing unit to be used in execution of the application handler, completion of transfer of data being detected by polling the indicated application state area.

10. The method of claim 9, wherein the at least one internal processing unit is at least one of a physical and logical processing unit and the at least two independent processing units are at least one of physical and logical processing units.

11. The method of claim 9, wherein the at least two independent processing units are remote processing units allowed to perform direct memory writes into the shared data structure.

12. The method of claim 9, wherein at least one of:
  the at least one internal processing unit is a virtual machine or container executing on at least one processor, and
  the at least two independent processing units are at least one of virtual machines and containers executing on at least one processor.

13. The method of claim 9, wherein the at least two independent processing units are independently startable and manageable processing units.

14. The method of claim 9, wherein each application handler is defined by application handler code accessible from memory for execution by the at least one internal processing unit.

15. The method of claim 9, wherein the initiating step comprises polling the shared data structure in response to a direct memory write setting a bit or a group of bits in the shared data structure to determine which application handler to at least one of prepare and activate.

16. An event-based processing system comprising at least one internal processing unit and associated memory, at least one area of the memory being accessible by at least two other independent processing units;
  the at least one area of the memory of the at least one internal processing unit comprising a data structure shared by the at least two other independent processing units that are allowed to perform direct memory writes into the shared data structure,
  the event-based processing system being configured to allocate, to each one of the at least two other independent processing units, a dedicated set of one or more bits in the shared data structure, each bit or each group of bits in the shared data structure indicating a unique combination of i) independent processing unit and ii) event handler for handling an event originating from the independent processing unit;
  the event-based processing system being configured to initiate, in response to a direct memory write setting a bit or a group of bits in the shared data structure, at least one of preparation and activation of the event handler indicated by the set bit or the set group of bits;
  the memory of the at least one internal processing unit further comprises, for each combination of independent processing unit and application handler, an application state area and a corresponding data area; and
  each bit or each group of bits further represents an application state area in the memory for storing information about the state of transfer of data from the corresponding independent processing unit to be used in execution of the application handler, completion of transfer of data being detected by polling the indicated application state area.

17. The event-based processing system of claim 16, wherein the event-based processing system is configured to at least one of prefetch and call executable code for the indicated event handler in response to the direct memory write.

18. The event-based processing system of claim 16, wherein the shared data structure is used as common activation for all communication to a receiving application program executed by the processing unit, wherein each communication is represented by a bit or a group of bits in the shared data structure that can be updated with a direct memory write from one of the independent processing units.

19. The event-based processing system of claim 16, wherein a direct memory write in the shared data structure indicates that an independent processing unit will send a message to the event-based processing system for execution by the indicated event handler.

* * * * *